(12) United States Patent
Kang

(10) Patent No.: US 9,086,837 B1
(45) Date of Patent: Jul. 21, 2015

(54) COLLABORATION SESSIONS

(71) Applicant: MicroStrategy Incorporated, Vienna, VA (US)

(72) Inventor: Hyunmo Kang, Laurel, MD (US)

(73) Assignee: MicroStrategy Incorporated, Vienna, VA (US)

(*) Notice: Subject to any disclaimer, the term of this patent is extended or adjusted under 35 U.S.C. 154(b) by 49 days.

(21) Appl. No.: 13/954,448

(22) Filed: Jul. 30, 2013

(51) Int. Cl.
- G09G 5/00 (2006.01)
- G06F 3/14 (2006.01)
- G06F 3/01 (2006.01)
- G06T 11/60 (2006.01)

(52) U.S. Cl.
CPC .............. *G06F 3/1423* (2013.01); *G06F 3/016* (2013.01); *G06F 3/1446* (2013.01); *G06T 11/60* (2013.01)

(58) Field of Classification Search
None
See application file for complete search history.

(56) References Cited

U.S. PATENT DOCUMENTS

2014/0300565 A1* 10/2014 Anderson et al. ............. 345/173

OTHER PUBLICATIONS

QlikView, "What's New in QlikView 11", Copyright 2011 QlikTech International AB, http://www.qlikview.com/us/explore/products/overview, 11 pages.

More on Web Sockets and HTML5 in Glassfish, Java.net [online], [retrieved on Sep. 11, 2012]. Retrieved from the Internet: http://weblogs.java.net/blog/spericas/archive/2010/10/13/more-web-sockets-and-html5-glassfish, 3 pages.
Multiuser Drawing Pad Built with Pure JavaScript/HTML5/Canvas, The Union Platform, by USER1 [online], [retrieved on Sep. 11, 2012]. Retrieved from the Internet: http://www.unionplatform.com/?page_id=2762, 3 pages.
Real-time Collaborative Editing with Web Sockets, Node.js & Redis, LakTEK [online], [retrieved on Sep. 11, 2012]. Retrieved from the Internet: http://laktek.com/2010/05/25/real-time-collaborative-editing-with-websockets-node-js-redis/, 4 pages.
Real-time data exchange in HTML5 with WebSockets, Adobe Developer Connection [online], [retrieved on Sep. 11, 2012]. Retrieved from the Internet: http://www.adobe.com/devnet/html5/articles/real-time-data-exchange-in-html5-with-websockets.html, 8 pages.
XLENT Technology—HTML5 Demos—WebSockets—Seadragon AJAX , Bing Translate , BingMaps—Magnus Thor [online], [retrieved on Sep. 11, 2012]. Retrieved from the Internet: http://kampanj.xlent.se/sockets/, 2 pages.

* cited by examiner

*Primary Examiner* — Muhammad N Edun
(74) *Attorney, Agent, or Firm* — Fish & Richardson P.C.

(57) ABSTRACT

A virtual canvas is associated with a first device and a second device based on the first device and the second device engaging in a collaboration session. The first device has a first display and the second device has a second display. A first field of view of the virtual canvas is defined for the first device and first input is received from the first device specifying first coordinates of the first display of the first device. Second input is received from the second device specifying second coordinates of the second display of the second device. Based on the first coordinates specified in the first input and the second coordinates specified in the second input, a second field of view for the second device is defined that aligns with the first field of view. Display of the virtual canvas is controlled based on the first and second fields of view.

17 Claims, 11 Drawing Sheets

COLLABORATION SESSIONS

TECHNICAL FIELD

This disclosure relates to handling collaboration sessions between multiple devices.

BACKGROUND

Two or more users can engage in collaborative use of an application by establishing a session over one or more networks. The collaborative session can enable users to interact within the application in real time.

DETAILED DESCRIPTION

A mobile device collaboration session enables multiple devices to access and view a shared virtual canvas. The shared virtual canvas can be accessed using computing devices that are associated with a single user or multiple users and that have been arranged to participate in a collaboration session. Each device can have a field of view of the virtual canvas that represents a portion of the shared virtual canvas. Image objects can be located within the virtual canvas, and the image objects or portions of the image objects can be displayed at a device involved in the collaboration session based on the image objects or the portions of the image objects being within the field of view defined for the device.

For example, a first user can access a virtual canvas using a first device and can upload an image object to the virtual canvas. The first user can move the image object to a particular location on the virtual canvas by dragging the image object about the canvas. A second user can access the virtual canvas using a second device and can be provided with a field of view of the virtual canvas. Depending upon the field of view of the second user's device, the second user may see the entire image object, a portion of the image object, or, if the image object is located at a position that is outside of the field of view of the second user's device, none of the image object. If the image object is within the field of view of the second user's device, the second user also may be able to move the image object about the virtual canvas.

When multiple devices are engaged in a mobile device collaboration session that uses a single virtual canvas, a field of view of the virtual canvas for each device may be determined based on inputs provided to those devices. To define a field of view of the shared virtual canvas, predefined inputs can be provided at each of two or more devices. The predefined input may be processed to alter or define a field of view for one or more of the two or more devices. For example, concurrent "tap and hold" inputs may be provided at a position on touchscreen displays of each device. Responsive to detecting the concurrent "tap and hold" inputs and the positions of the inputs, the positions can be defined as a common point on the shared canvas such that the fields of view of the devices overlap, with the input position on each device corresponding to the same point on the shared virtual canvas.

Figure 1:
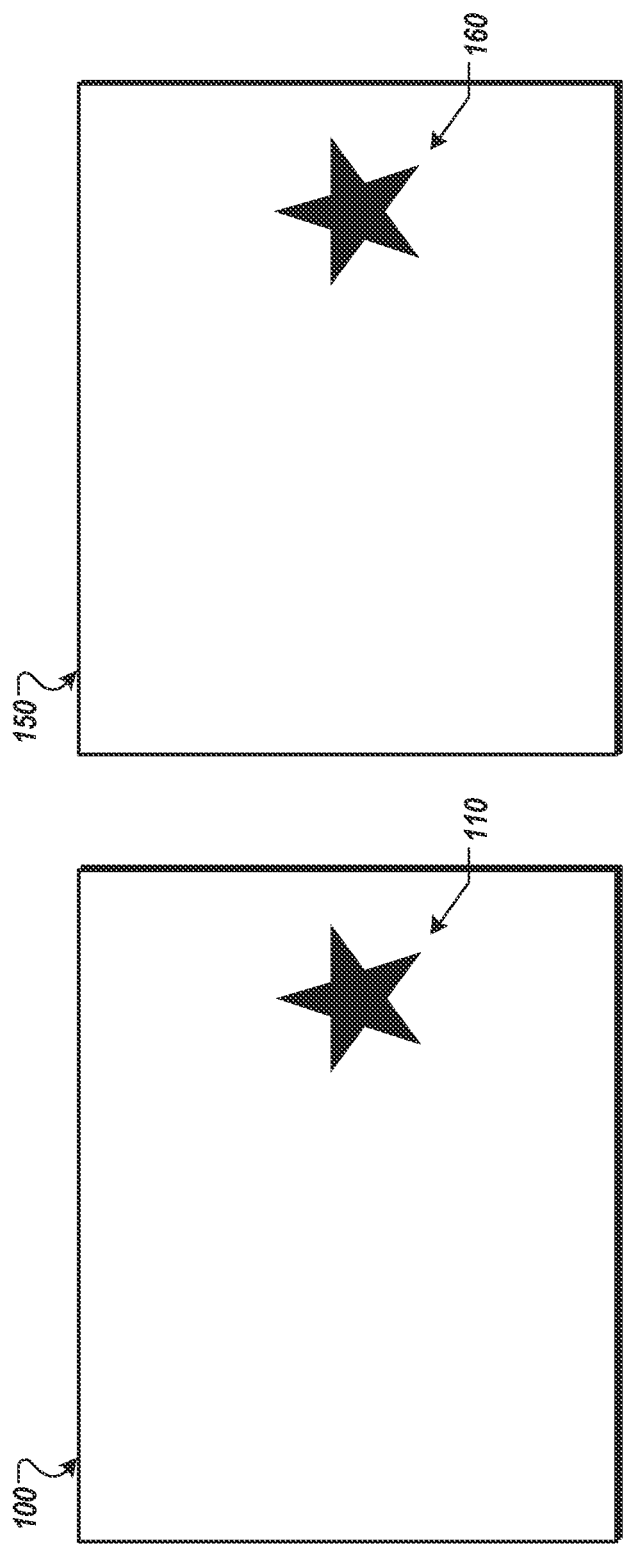
FIGS. 1-5 illustrate example user interfaces of a mobile device collaboration session.

FIG. 1 illustrates example user interfaces 100, 150 that can be displayed at two different devices engaged in a collaboration session. As shown, each of the user interfaces 100,150 displays a field of view of a shared virtual canvas, where the fields of view of each device are the same portion of the virtual canvas.

In some implementations, the devices displaying user interfaces 100, 150 have been configured to participate in a collaboration session. For example, the devices displaying user interfaces 100, 150 have accessed the shared virtual canvas by navigating web browsers of the devices to a web site that hosts the shared virtual canvas. In this example, the shared virtual canvas can be hosted at a web site, and the devices can access the shared virtual canvas by navigating their web browsers to the same web site. The user interfaces 100, 150 have the same field of view of the shared virtual canvas when the collaboration session starts.

A shared virtual canvas can be a two-dimensional or a three-dimensional virtual canvas associated with a coordinate system that indicates points on the shared canvas. In some implementations, units of the coordinate system can correspond to pixels of a device's display. In these implementations, a field of view of a device is defined by coordinates of the virtual canvas that define an area of the virtual canvas equal to the device's resolution. For example, a device having a display resolution of 1024 pixels wide by 768 pixels tall, i.e., 1024×768, can have a field of view of the virtual canvas that is defined by the coordinates (0,0), (0, 768), (1024, 0), and (1024, 768) of the virtual canvas.

When a device's field of view of the virtual canvas is defined by the resolution of the display of the device, devices having displays with different resolutions can have fields of view of the virtual canvas that are of different sizes. For example, a first device with a display resolution of 1280× 1024 may have a larger field of view of the virtual canvas than a second device with a display resolution of 1024×768.

In some examples, a field of view of a device can depend on a pixel size of the device's display, as well as the device's resolution. In some examples, a particular device's field of view of a shared virtual canvas can be scaled to remain proportional to other devices' fields of view based on the pixels of the particular device having a certain size.

For instance, a first display can have a resolution of 1024× 768 and a first pixel size, and a second display can have a resolution of 1024×768 with a pixel size that is smaller than the first display, thereby making the second display smaller than the first display. To compensate for the smaller pixel size of the second display such that the fields of view of the two displays are proportional to the size of the displays (so that the field of view of the second display is smaller than the field of view of the first display), the field of view of the second display can be scaled to be smaller. For example, if a first and second display both have resolutions of 1024×768, but the second display has dimensions that are 20% smaller than the first display due to a smaller pixel size, the second device can be assigned a field of view that is defined by the coordinates (0,0), (0, 614), (819, 0), and (819, 614), i.e., such that the dimensions of the second display's field of view are 20% less than the dimensions of the first display's field of view, despite the two devices having the same 1024×768 resolution.

Returning to the user interfaces 100, 150 of FIG. 1, the fields of view of each of the user interfaces 100, 150 show the same portion of the shared virtual canvas. Specifically, the fields of view show a portion of the shared virtual canvas that includes an image object 110, 160 of a star. For example, a first device associated with the user interface 100 and a second device associated with the user interface 150 can each have displays with the same resolution, e.g., 1024×768, and can each show the same portion of the shared virtual canvas. For instance, the field of view of both the first and second devices can be defined by the coordinates (0, 0), (0, 768), (1024, 0), and (1024, 768) of the virtual canvas.

An image object 110, 160 is positioned in the shared virtual canvas at a location that enables the image object to be displayed at the user interfaces 100, 150. For example, the image object 110, 160 is an image of a star that has been uploaded to the shared virtual canvas by a user. The image object 110, 160 is a single image object on the virtual canvas that has been positioned to a location that is within the field of view of both of the devices, enabling the image object 110, 160 to be displayed at both of the user interfaces 100, 150. In some implementations, the image object 110, 160 can be positioned by a user based on the user selecting and dragging the image on the virtual canvas, e.g., by performing a "click, hold, and drag" operation using a cursor in one of the user interfaces 100, 150, or, if the device has a touchscreen, a "touch and drag" operation in one of the user interfaces 100, 150. For example, a user may have positioned the image object to be centered at the coordinates (700, 400) of the shared virtual canvas, the image object 110, 160 having both a width and height of, for example, 200 pixels. Since the image object 110, 160 is of a size and position that places the full image object 110, 160 within the fields of view of the user interfaces 100, 150, the full image of the star is displayed in the user interfaces 100, 150. In some implementations, other transformations can be performed on the image object 110, 160 in addition to translation, including, for example skewing, scaling, rotating, and/or manipulating the z-distance of the image object, in implementations in which the shared virtual canvas is a three dimensional space. Operations or gestures performed to effect these transformations may include, for example, "pinch" and/or "rotate" operations, among others.

Figure 2:
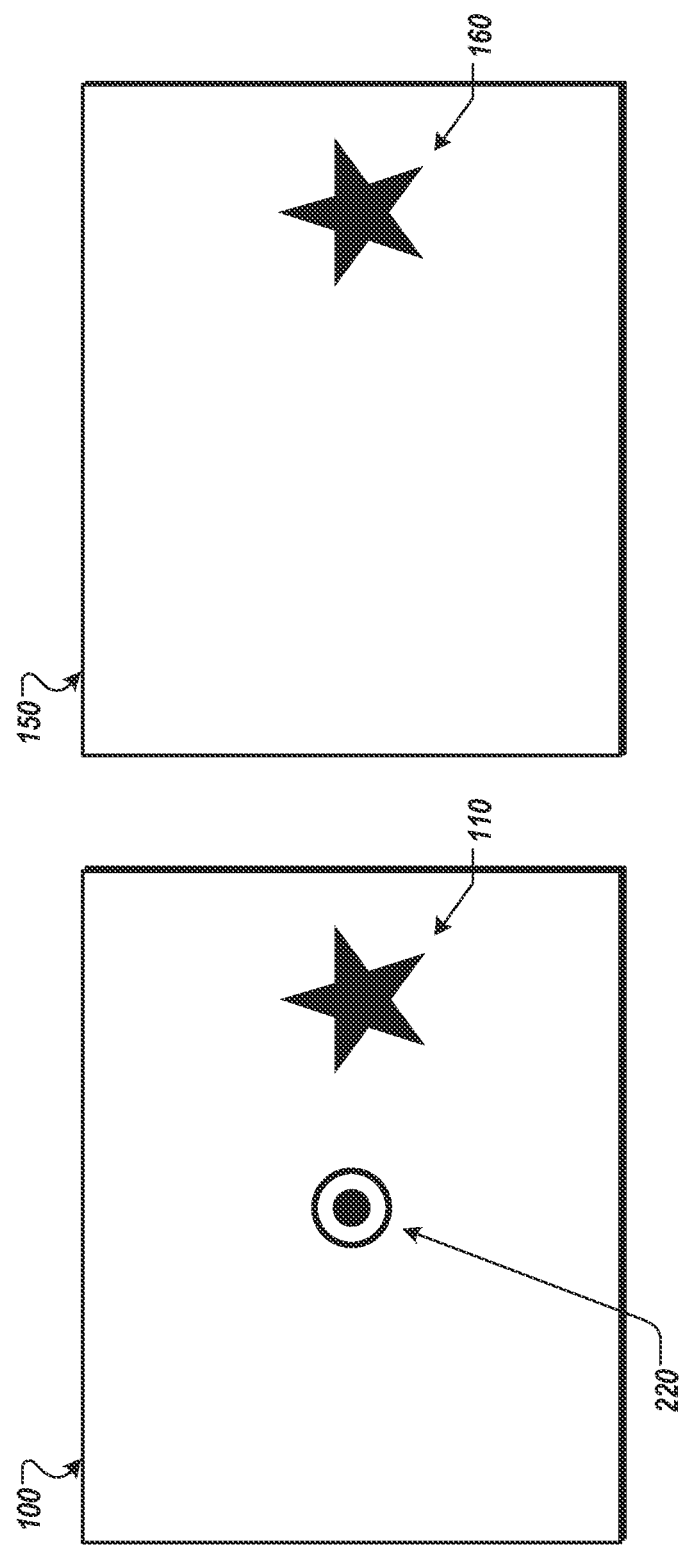

FIG. 2 illustrates example user interfaces 100, 150 at a time when a user associated with a device displaying the user interface 100 has provided an input identifying a point 220 on the user interface 100. The identified point 220 on the user interface 100 corresponds to a location on the shared virtual canvas.

For example, the point 220 can be identified as being in the exact center of the user interface 100. Based on the field of view of the user interface 100 being defined by the coordinates (0,0), (0, 768), (1024, 0), (1024, 768) of the shared virtual canvas, the point 220 can correspond to the location on the shared virtual canvas defined by the coordinates (512, 384), based on the input being at a point 220 in the center of the field of view of the user interface 100.

In some implementations, the user interfaces 100, 150 can be displayed at touchscreen devices, for example, at the displays of smart phones or tablet computers, and an input provided by a user can be a "tap and hold" input that identifies a point, such as the point 220 on the user interface 100. A "tap and hold" input can be defined, for example, by a user making contact with a touchscreen and maintaining contact with the touchscreen for at least a threshold period of time. Additionally or alternatively, a "tap and hold" input can be defined, for example, by a user making contact with a touchscreen, releasing the contact, and, within a threshold amount of time, reapplying the contact for at least a threshold period of time. Other gestures performed at touchscreen devices can be identified as inputs that define a point on a user interface. For example, an input can be defined by a "double tap" gesture on the touchscreen, or can be defined by another gesture that indicates that the input is an input identifying a point on the user interface to use in defining a field of view in a collaboration session. In some implementations, an input that identifies a point on the user interface can be a unique input associated with adjusting a device's field of view of a virtual canvas.

In some implementations, the user interfaces 100, 150 can be displayed at devices that do not have touchscreens, for example, at a device that uses a cursor controlled by a mouse or track pad such as a laptop or desktop computer. In such an implementation, an input that defines a point of the user interface can be provided in the form of a "double click," "click and hold," "triple click," "right click," or other input that indicates that the input is an input to identify a point on the user interface to use in defining a field of view in a collaboration session.

Figure 3:
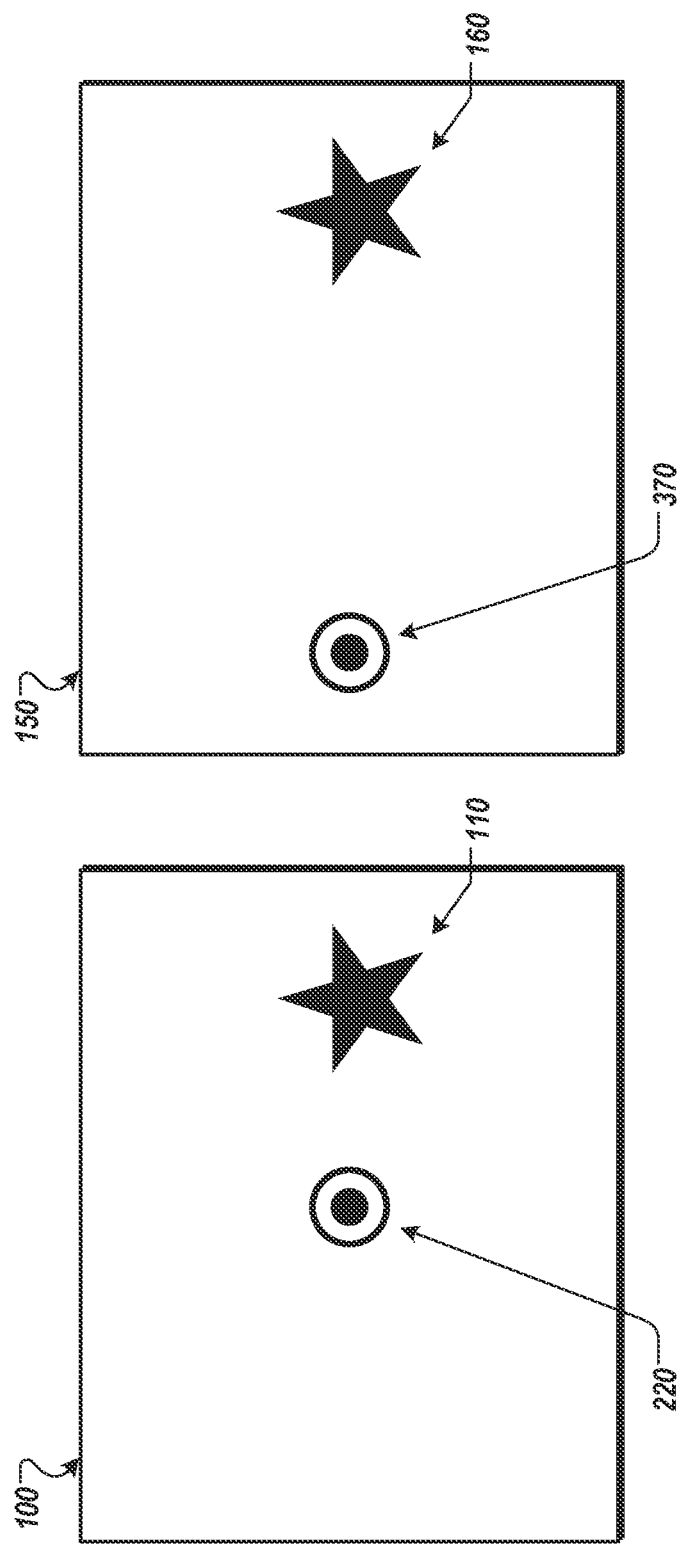

FIG. 3 illustrates example user interfaces 100, 150 at a time when a user of a device displaying the user interface 150 has provided an input identifying a point 370 on the user interface 150. The identified point 370 on the user interface 150 corresponds to a location on the shared virtual canvas that is defined by coordinates of the virtual canvas.

For example, the point 370 can be identified as being at an off-center position on the user interface 150. Based on the field of view of the user interface 150 being defined by the coordinates (0,0), (0, 768), (1024, 0), (1024, 768) of the virtual canvas, the point 370 can correspond to a location on the shared virtual canvas that is off-center from the defined field of view of the user interface 150. For instance, the point 370 can correspond to a location on the shared virtual canvas defined by the coordinates (200, 384) based on the input being at a point 370 that is to the left of the center of the user interface 150 and precisely in the middle of the user interface 150 in the vertical direction.

In some implementations, the input provided by the second user at the user interface 150 can be defined by a "tap and hold" or other input, as described previously, to identify the point 370 in the user interface 150. For example, the second device displaying the user interface 150 can be a touchscreen device, and the input identifying the point 370 can be a "tap and hold" gesture performed by the user associated with the device displaying the user interface 150.

In some implementations, the input identifying the point 220 and the input identifying the point 370 can be performed concurrently by one or more users associated with the devices displaying the user interfaces 100, 150. For example, a first user can provide the input identifying the point 220 using a "tap and hold" gesture, and while the first user is "holding" at the point 220, a second user can provide the input identifying the point 370 using a "tap and hold" gesture. In other implementations, the input identifying the point 220 can be performed before the input identifying the point 370, or can be performed after the input identifying the point 370. For example, the first user can provide the input identifying the point 220 using a "tap and hold" gesture, and after releasing the "tap and hold" gesture, the second user can provide the input identifying the point 370 using a "tap and hold" gesture.

Figure 4:
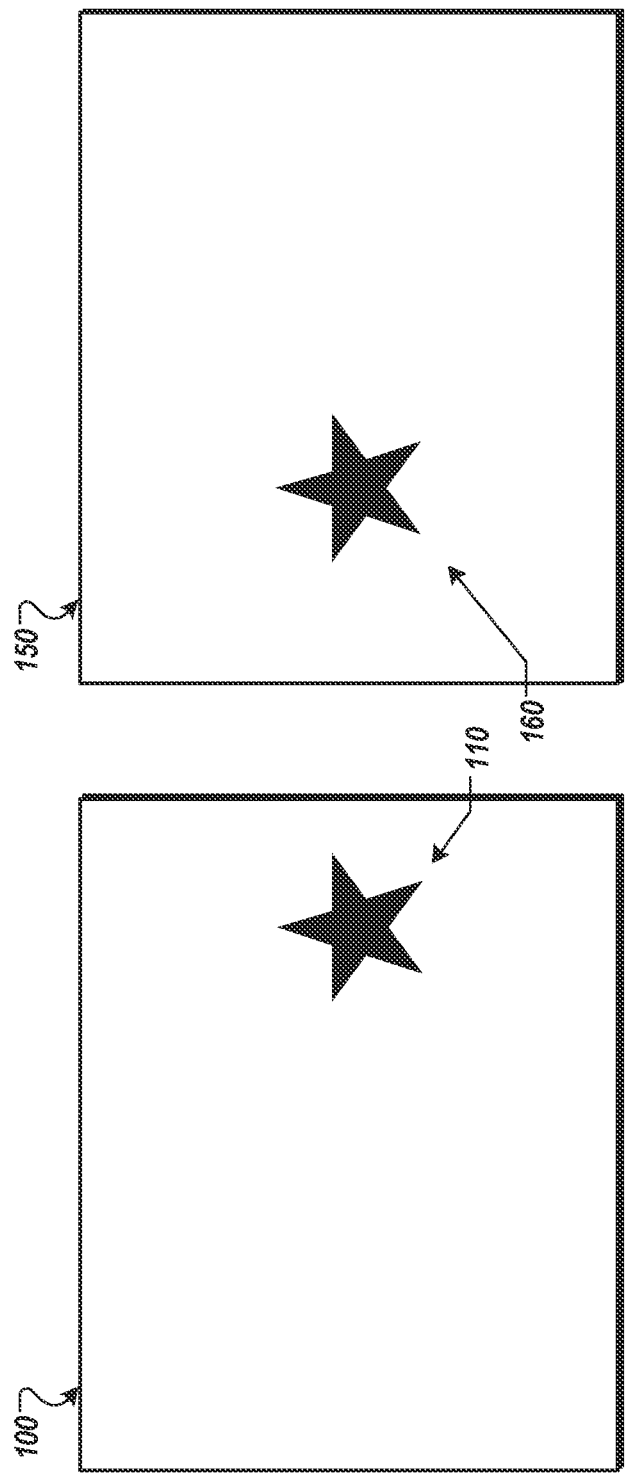

FIG. 4 illustrates example user interfaces 100, 150 at a time when the field of view of the user interface 150 has been adjusted based on the inputs defining the points 220 and 370. As shown in FIG. 4, the field of view of the user interface 150 has been shifted such that the location on the shared virtual canvas that was identified by the point 370 now corresponds to the location on the shared virtual canvas that was identified by the point 220. That is, the field of view of the user interface 150 has been shifted such that the point 220 and the point 370 define a common location on the shared virtual canvas.

For example, the point 220 as described with respect to FIG. 2 corresponds to the location on the shared virtual canvas that is defined by the coordinates (512, 384), and the point 370 as described with respect to FIG. 3 corresponds to the location on the shared virtual canvas that is defined by the coordinates (200, 384). As illustrated in FIG. 4, the field of view of the user interface 100 has been maintained as being defined by the coordinates (0,0), (0, 768), (1024, 0), and (1024, 768) of the virtual canvas. However, as further illustrated in FIG. 4, the field of view of the user interface 150 has been shifted such that the point 370 of the user interface 150 corresponds to the location on the shared virtual canvas that is defined by the coordinates (512, 384). Based on the field of view of the user interface 150 being shifted, the new field of view of the user interface 150 can be defined by the coordinates (312, 0), (312, 768), (1336, 0), and (1336, 768) of the virtual canvas.

After the field of view of the user interface 150 has been adjusted, e.g., shifted to the right on the shared virtual canvas, the image object 110, 160 of the star appears in a different position on the user interface 150 than it appeared previously. For example, the image object 110 is displayed in the same position on the right side of the user interface 100 as it was previously, based on the field of view of the user interface 100 not being shifted. However, the image object 160 is now displayed towards the left hand side of the user interface 150, based on the field of view of the user interface 150 being shifted to the right on the virtual canvas. Thus, the mobile device collaboration session enables the display of a shared virtual canvas across multiple devices. The fields of view of the devices can show the same or different portions of the virtual canvas, and can be shifted to arbitrary locations on the virtual canvas based on user inputs.

In some implementations, the order of the inputs identifying the points 220, 370 can be used to determine which of the fields of view maintains its location on the shared virtual canvas and which of the fields of view is shifted. For example, based on the input identifying the point 220 being initiated first, the user interface 100 maintains its field of view, and the field of view of the user interface 150 is shifted. In another example, based on the input identifying the point 370 being initiated first, the user interface 150 can maintain its field of view and the user interface 100 can be shifted.

Figure 5:
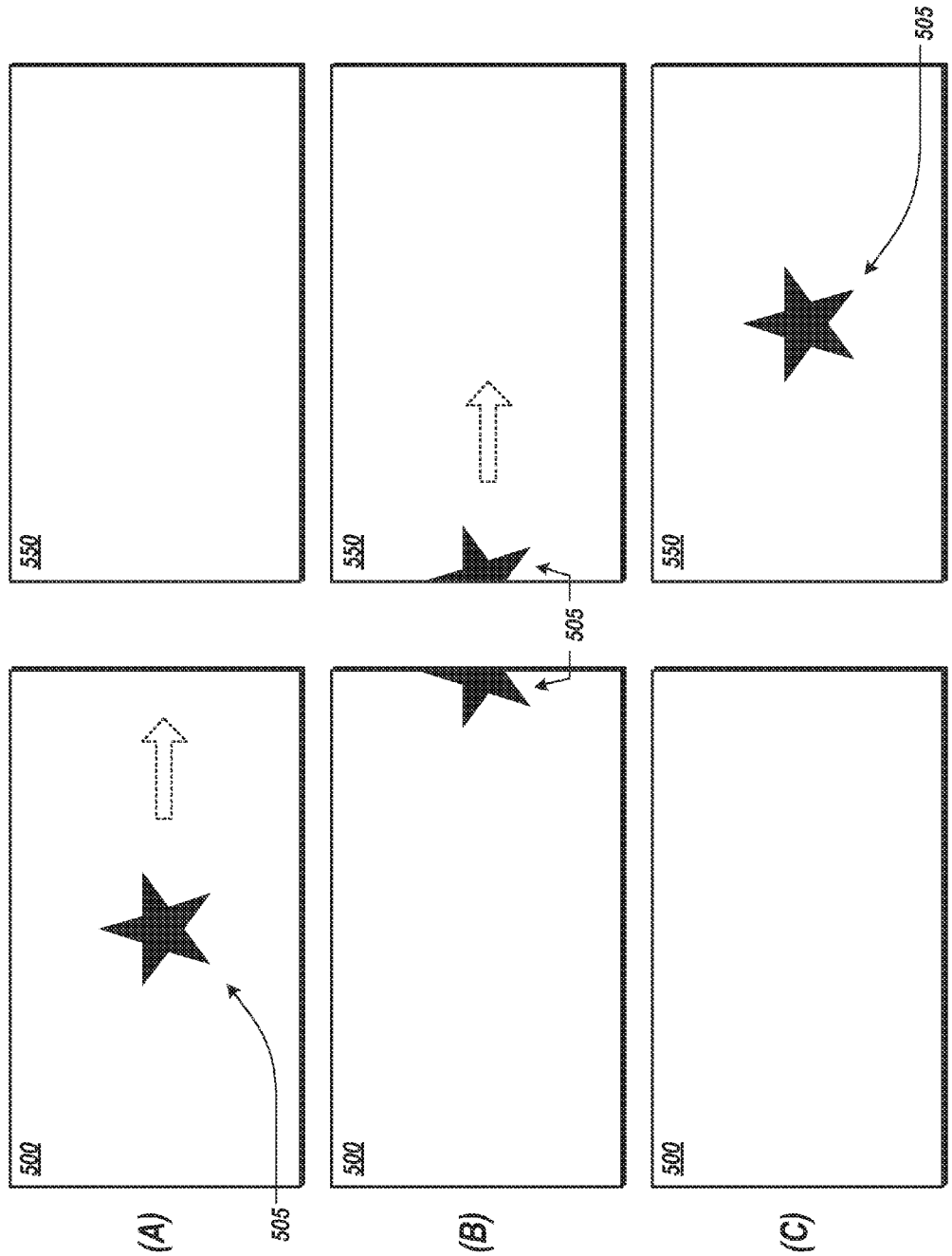

FIG. 5 illustrates example user interfaces 500, 550 that exhibit how an image object can be moved within a shared virtual canvas to affect how the image object is displayed at user interfaces 500, 550 having different fields of view. As shown, an image object 505 of a star has been included on a shared virtual canvas.

At time (A), the image object 505 of a star has been positioned within the virtual canvas such that the image object 505 is only displayed at the user interface 500. Specifically, the image object 505 can be at a location on the virtual canvas that is within the field of view of the user interface 500.

As shown in FIG. 5, the user interfaces 500, 550 can have fields of view of the virtual canvas that are adjacent to one another, but not overlapping. For example, devices associated with the user interfaces 500, 550 can each have a resolution of 1024×768, and the field of view of the user interface 500 can correspond to the area of the virtual canvas defined by the coordinates (0,0), (0, 768), (1024, 0), and (1024, 768). The field of view of the user interface 550 can correspond to the area of the virtual canvas immediately adjacent to the area of the virtual canvas defined by the first field of view. Thus, the field of view of the user interface 550 can correspond to the area of the virtual canvas defined by the coordinates (1024, 0), (1024, 768), (2048, 0), and (2048, 768). As seen in the user interface 500, the image object 505 is centered within the first user interface 500. Thus, the image object 505 can be centered at a location on the shared virtual canvas that is defined by the coordinates (512, 384) of the virtual canvas, since those coordinates correspond to the center of the field of view of the user interface 500.

After time (A), a user of a device associated with the user interface 500 can provide an input to begin to move the image object 505 within the shared virtual canvas. For example, the user can begin to move the image object 505 towards the right of the user interface 500. In some implementations, a user can move an image object that is at least partially visible in a user interface. That is, an image object can be moved by a user so long as the image object is positioned on a shared virtual canvas such that at least a portion of the image object is within a field of view of the user interface.

In some implementations, a user can move an image object to a particular position within a user interface by dragging the image object about the virtual canvas. For example, a device can be a touchscreen device, and a user of the touchscreen device can move an image object by pressing the object displayed in the user interface and dragging the object to a desired position within the user interface. Based on the user moving the image object within the user interface, the location of the image object on the virtual canvas is correspondingly shifted. For example, a user interface can have a field of view of a virtual canvas that corresponds to an area of the virtual canvas, and based on a user moving an image object within the user interface to a new position in the user interface, the location of the image object on the virtual canvas can be updated to the location that corresponds to the new position of the image object in the user interface.

In some implementations, an image object can only be moved by a user if at least a portion of the image object is displayed in a user interface of the user's device. For example, at time (A) of FIG. 5, the image object 505 can be moved by a user having access to the user interface 500, but cannot be moved by a user having access to the user interface 550, based on the image object 505 only being displayed within the user interface 500. In some implementations, a user can move an image object by performing a "touch and drag," "clench and drag," or other gesture when the device is a touchscreen device, or can move an object by performing a "click and drag," "right click and drag," or other operation when the device is a device that uses a cursor controlled by a mouse or track pad, such as a laptop or desktop computer. In some implementations, a user can move an image object by selecting the object and performing a "flick" or "toss" operation, such that movement of the image object can simulate momentum. Using such an operation, a user can move an image object beyond the field of view of a user interface due to the simulated momentum of the image object's movement.

Referring again to FIG. 5, at time (B), the image object 505 of the star has been positioned within the virtual canvas such that half of the image object 505 is displayed at the user interface 500 and half of the image object 505 is displayed at the user interface 550. For example, the user interfaces 500, 550 can have the same fields of view of the virtual canvas as at time (A), and the user associated with the device having user interface 500 has moved the image object 505 to the position shown at time (B).

As shown at time (B), the image object 505 of the star has been moved to a position on the shared virtual canvas such that the center of the image object 505 is located at the right hand edge of the field of view of the user interface 500 and at the left hand edge of the field of view of the user interface 550. For example, based on the user interfaces 500, 550 having the fields of view of the virtual canvas that are defined by the coordinates provided with respect to time (A), at time (B), the image object 505 is centered at the point on the shared virtual canvas defined by the coordinates (1024, 384).

After time (B), users associated with devices displaying either the user interface 500 or the user interface 550 can provide an input to begin to move the image object 505. For example, the first user associated with the first device displaying the user interface 500 can begin to move the image object 505 towards the right of the user interface 500. In some implementations, the first user can move the image object 505 to the right by dragging or "flicking" the image object 505 to the right, such that the image object 505 moves further out of the field of view of the user interface 500 and further into the field of view of the user interface 550. Alternatively, a second user associated with the second device displaying the user interface 550 can begin to move the image object 505 towards the right of the user interface 550. For example, the second user can begin to move the image object 505 to the right by dragging or "flicking" the image object 505 to the right, such that the image object moves further into the field of view of the user interface 550 and further out of the field of view of the user interface 500.

At time (C), the image object 505 of a star has been positioned within the shared virtual canvas such that the image object 505 is displayed fully at the user interface 550 and none of the image object 505 is displayed at the user interface 500. For example, the user interfaces 500, 550 can have the same fields of view of the virtual canvas as at times (A) and (B), and the image object 505 has been moved to the position shown at time (C).

As shown, the image object 505 of the star has been moved to a position on the shared virtual canvas such that the center of the image object 505 is located at the center of the field of view of the user interface 550. Based on the user interfaces 500, 550 having fields of view of the virtual canvas that are defined by the coordinates provided with respect to time (A), at time (C), the location of the image object 505 on the shared virtual canvas can be defined by the coordinates (1536, 384).

To position the image object 505 at the location on the virtual canvas corresponding to time (C), the image object 505 can be moved by either a user of a device having the user interface 500 or a user of a device having the user interface 550. For example, a user having access to the user interface 500 can perform a "flicking" gesture at a touchscreen of the device displaying the user interface 500 to move the image object 505 across the virtual canvas with simulated momentum. Based on the simulated momentum of the image object's 505 movement, the image object 505 can stop at the position shown in user interface 550. Alternatively, a user having access to the user interface 550 can move the image object 505 by dragging or "flicking" the image object 505 across the user interface 550, to move the image object 505 to the position shown in the user interface 550 at time (C).

As of time (C), only a user having access to the user interface 550 can move the image object 505. Specifically, based on the virtual canvas being accessed only by the devices associated with user interfaces 500, 550, and based on the image object 505 being located entirely outside of the field of view of the user interface 500, only the user associated with the device featuring user interface 550 can move or otherwise manipulate the image object 505. However, changes to the position of the image object 505 on the virtual canvas and/or the field of view of the user interface 500 can enable the user having access to the user interface 500 to move or otherwise manipulate the image object 505.

As an example, a user associated with a device displaying the user interface 500 may be able to move the image object 505 at a time after time (C) if the image object 505 is relocated on the shared virtual canvas such that at least a portion of the image object 505 is within the field of view of the user interface 500. In another example, the user associated with the device displaying the user interface 500 may be able to move the image object 505 if the field of view of the user interface 500 is redefined such that at least a portion of the image object 505 is within the field of view of the user interface 500. In some implementations, the users having access to the user interfaces 500, 550 can redefine the field of view of the user interface 500 using the techniques described with respect to FIGS. 1-4.

Figure 6:
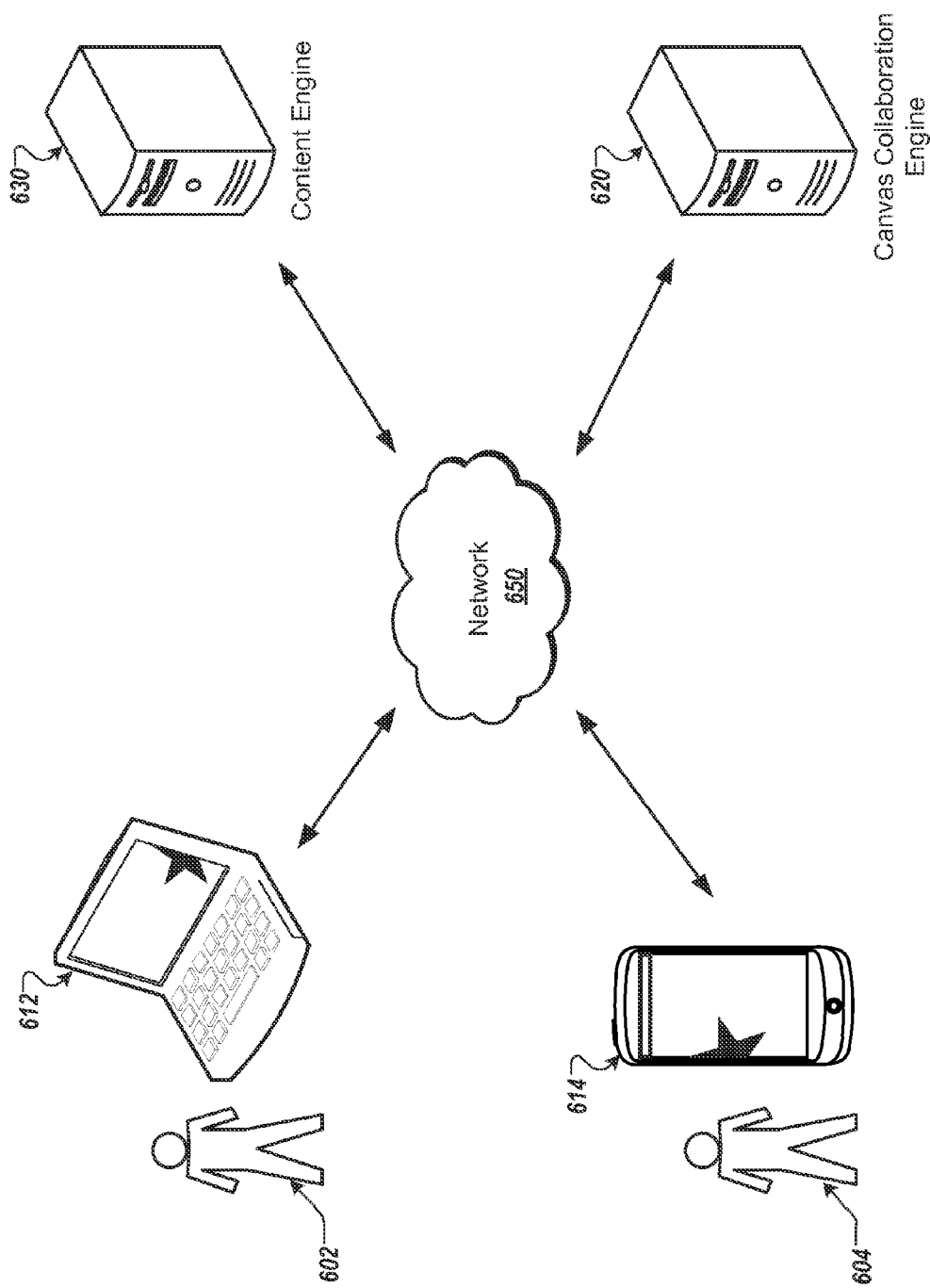
FIG. 6 is a diagram of an example system for enabling mobile device collaboration sessions.

FIG. 6 illustrates an example system 600 for enabling mobile device collaboration sessions. Specifically, the system 600 can enable two or more devices to access a shared virtual canvas, to adjust fields of view of the virtual canvas for each of the two or more devices, and to interact with objects within the shared virtual canvas.

Briefly, the system 600 includes a first device 612 associated with a first user 602, a second device 614 associated with a second user 604, a canvas collaboration engine 620, and a content engine 630. The devices 612, 614, the canvas collaboration engine 620, and the content engine 630 can exchange electronic communications over the network 650.

As described herein, a device 612, 614 can be any type of computing device, including, but not limited to, a mobile phone, smart phone, personal digital assistant (PDA), music player, e-book reader, tablet computer, laptop computer, desktop computer, or other stationary or portable device, that includes one or more processors and non-transitory computer-readable storage media. Software applications associated with the devices 612, 614 can be written in any suitable programming language capable of performing operations assigned to the particular software applications, such as, for example, Objective-C, C++, Java, etc.

The canvas collaboration engine 620 and the content engine 630 can each be implemented using any suitable computer, server, or collection of computers or servers executing software capable of storing and managing data. In some systems, the canvas collaboration engine 620 and the content engine 630 are implemented on the same computer, server, or collection of computers or servers, or can be implemented independently using different computers, servers, or collections of computers or servers. In some implementations, the canvas collaboration engine 620 and the content engine 630 can access data and perform operations over one or more network connections, such as one or more connections to the network 650. In practice, the network 650 can be one or more local area networks (LAN), or wide area networks (WAN), such as the Internet, and the devices 612, 614, canvas collaboration engine 620, and content engine 630 can connect to the network 650 using one or more wired or wireless connections.

The system 600 can support mobile device collaboration sessions by enabling multiple devices 612, 614 to access a shared virtual canvas, to define fields of view of the devices 612, 614, and to load and interact with image data within the shared virtual canvas. To establish mobile application collaboration sessions and to enable the actions described herein, the devices 612, 614, canvas collaboration engine 620, and content engine 630 can each be connected to the network 650 and can exchange electronic communications over the network 650.

A mobile device collaboration session can be arranged by one or more mobile devices 612, 614 at the canvas collaboration engine 620. For example, the canvas collaboration engine 620 can establish a shared virtual canvas that is accessible by one or more devices 612, 614, and the devices 612, 614 can access the shared virtual canvas over the network 650. In some implementations, the canvas collaboration engine 620 can establish a shared virtual canvas when a device attempts to access a shared virtual canvas or requests that a new shared virtual canvas be created. The canvas collaboration engine 620 may maintain or store one or more existing virtual canvases that can be accessed by the devices 612, 614.

In some implementations, the devices 612, 614 access a shared virtual canvas using the WebSocket protocol. For example, the canvas collaboration engine 620 can host a virtual canvas that is accessible via the WebSocket protocol, and the devices 612, 614 can access the virtual canvas over the network 650. In some instances, the devices 612, 614 can include web browsers, and each of the devices 612, 614 can access the shared virtual canvas by entering the same uniform resource locator (URL) at the web browsers.

In practice, the devices 612, 614 can access a shared virtual canvas using other full-duplex or half-duplex communications channels. For example, the devices 612, 614 can access a shared virtual canvas using other transmission control protocol (TCP) connections, or can access a shared virtual canvas that is hosted at a location other than the Internet using one or more Ethernet connections, Bluetooth connections, HomePlug (Ethernet over powerline) connections, or other wired or wireless connections.

In establishing a connection to a shared virtual canvas, the devices 612, 614 can transmit information to the canvas collaboration engine 620 identifying the device 612, 614 and/or information enabling shared use of the virtual canvas. In some implementations, the devices 612, 614 each transmit information identifying the resolution of a display associated with each of the devices 612, 614. For example, information can identify the resolution of a first device 612 as 1024×768 pixels, and can identify the resolution of a second device 614 as 320×480 pixels. The information can include the pixel size for the display of the device 612, 614 in addition to the display resolution. The information also can include other relevant information, such as information identifying a user 602, 604 of the device 612, 614, a model or brand name of the device 612, 614, etc. The information enabling the device 612, 614 to establish a connection to a shared virtual canvas can be transmitted by the devices 612, 614 over the network 650.

In response to receiving information related to connecting to a shared virtual canvas, the canvas collaboration engine 620 can identify and/or create a shared virtual canvas, and can enable the devices 612, 614 to access the shared virtual canvas. For example, an existing virtual canvas can be identified by the canvas collaboration engine 620, or a new virtual canvas can be created based on receiving a request from the devices 612, 614 to access a shared virtual canvas. After identifying or creating a shared virtual canvas, the devices 612, 614 can connect to the shared virtual canvas. For instances in which the devices 612, 614 use the WebSocket protocol to connect to a shared virtual canvas, the devices 612, 614 can establish a connection to the shared virtual canvas by performing a handshake between a client associated with the devices 612, 614 and the canvas collaboration engine 620, e.g., based on the devices' 612, 614 web browsers sending handshake requests and the canvas collaboration engine 620 sending corresponding handshake responses.

In some implementations, a virtual canvas can be a data structure representing a space for objects within a two-dimensional plane. A virtual canvas can be an infinite virtual canvas, can be a virtual canvas with a fixed size, or can have a size that adjusts based on the objects and locations of the objects within the virtual canvas. In addition, a virtual canvas can have a size that adjusts based on the resolution of the devices 612, 614 that access the shared virtual canvas. The virtual canvas can be associated with a coordinate system, such as a Cartesian or polar coordinate system, used to define the locations of objects and fields of view in the virtual canvas. In some implementations, a virtual canvas can be three-dimensional, and the virtual canvas can be associated with a Cartesian, cylindrical, spherical, or other coordinate system used to define the locations of objects and fields of view in the three-dimensional virtual canvas. In some implementations, the virtual canvas can be implemented as a vector matrix, or using another data type.

After establishing connections between the devices 612, 614 and the virtual canvas, an initial field of view of the virtual canvas is established for each device 612, 614. In some implementations, an initial field of view of the virtual canvas for all of the devices 612, 614 can include the origin of the virtual canvas coordinate system and can be defined by the resolution of the devices 612, 614. For example, the device 612 having a display resolution of 1024×768 can have the initial field of view defined by the coordinates (0,0), (0, 768), (1024, 0), and (1024, 768), and the device 614 having a display resolution of 320×480 can have the initial field of view defined by the coordinates (0, 0), (0, 480), (320, 0), and (320, 480).

In some implementations, an initial field of view can be centered or otherwise include the origin of the virtual canvas. For example, an initial field of view of the device 612 having the resolution of 1024×768 can be defined by the coordinates (−512, 384), (−512, −384), (512, 384), and (512, −384) of the virtual canvas. The initial fields of view of the devices 612, 614 can be overlapping, adjacent, partially overlapping, or otherwise positioned relative to the coordinate system of the virtual canvas or to each other. In some instances, an initial field of view can be defined to be centered or defined to contain one or more objects that are on the virtual canvas.

Based on the devices 612, 614 being granted access to the shared virtual canvas and assigned an initial field of view, users of the devices 612, 614 can adjust the fields of view of the devices 612, 614 using the techniques described previously with respect to FIGS. 1-4. For example, the user 602 can perform a "tap and hold" gesture at the center of the right-hand edge of the display associated with the device 612, and the user 604 can perform a subsequent "tap and hold" gesture at the center of the left-hand edge of the display associated with the device 614. Based on the inputs, the fields of view of the devices 612, 614 can be defined such that the device 612 maintains its field of view, e.g., the field of view defined by the coordinates (0,0), (0, 768), (1024, 0), and (1024, 768), and the device 614 has a new field of view that is adjacent and to the right of the field of view of the device 612, e.g., the field of view defined by the coordinates (1024, 144), (1024, 624), (1344, 144), and (1344, 624).

In some implementations, adjustments to one or more fields of view can be determined by data sent to and/or received from the devices 612, 614 by the canvas collaboration engine 620. For example, data can be received from the device 612 indicating that a first "tap and hold" gesture has been input by a user 602. The data indicating the "tap and hold" input can identify a field of view of the device 612, e.g., the coordinates of the virtual canvas defining the device's 612 field of view, and/or can identify a point on the display of the device 612 that corresponds to a location on the virtual canvas. For example, data indicating a "tap and hold" input at the center of the right edge of the display of the device 612 can identify the current field of view of the device 612, as well as the point corresponding to the "tap and hold" input. In some instances, the point corresponding to the "tap and hold" input identifies a coordinate location on the display of the device 612 corresponding to the "tap and hold" input, or identifies a coordinate location on the virtual canvas corresponding to the "tap and hold" input. Data can also be received from the device 614 indicating that a second "tap and hold" gesture has been input by the user 604. The data indicating the second "tap and hold" gesture can be similar to the data indicating the first "tap and hold" gesture, e.g., the data can indicate a field of view of the device 614, and/or a point on the display of the virtual canvas corresponding to the second "tap and hold" input.

The canvas collaboration engine 620 can redefine the fields of view of the devices 612, 614 using the received data, and can transmit information indicating the adjusted fields of view to the devices 612, 614. In some instances, a device only receives information that is pertinent to its own field of view. For example, the device 612 may only receive information defining its field of view of the virtual canvas. In other instances, a device can receive information identifying fields of view of all devices that are accessing the virtual canvas. For example, the device 612 can receive information defining its own field of view as well as the field of view of the device 614.

In some implementations, information defining the fields of view of all devices is transmitted whenever any of the fields of view are adjusted. For example, information identifying the fields of view of both devices 612, 614 can be transmitted, despite only the field of view of the device 614 being adjusted. In other implementations, only information defining new or adjusted fields of view is transmitted. For example, based on a field of view of the device 614 being adjusted and the field of view of the device 612 remaining unchanged, only information identifying the adjusted field of view of the device 614 is transmitted.

Objects (e.g., images, document files, graphics, etc.) can be included on a virtual canvas that is accessible to the devices 612, 614. Based on objects being included in the virtual canvas, the devices 612, 614 can view the objects or portions of the objects that are within the fields of view of the devices 612, 614. In some implementations, objects can be uploaded to a shared virtual canvas by a user 602, 604 associated with a device 612, 614. For example, an object can be stored locally on a device 612, 614, and a user 602, 604 associated with the device 612, 614 can choose the object and can upload the object to the shared virtual canvas. For instance, data including the object can be transmitted by the device 612, 614 to the canvas collaboration engine 620 over the network 650, and the object can be included in the shared virtual canvas by the canvas collaboration engine 620. An object that has been included in the shared virtual canvas can then be viewed or moved by users of the devices 612, 614, based on the object or a portion of the object being within the devices' 612, 614 fields of view.

In some examples, a user 602, 604 associated with a device 612, 614 can identify an object that is accessible by the canvas collaboration engine 620 over one or more networks, and the object can be included in the shared virtual canvas based on the canvas collaboration engine 620 accessing data associated with the object. In some instances, the identified object is an object that is accessible at the content engine 630, and the canvas collaboration engine 620 can communicate with the content engine 630 to access the object data. For example, a user 602 associated with a device 612 can select an object to include in a shared virtual canvas from among a list of stock objects. The canvas collaboration engine 620 can then access a database associated with the content engine 630 to obtain the stock object data, and can include the stock object in the shared virtual canvas.

In another example, a user 602 associated with a device 612 can identify an object using a URL that is accessible on the Internet, and the device 612 can transmit the URL to the canvas collaboration engine 620. The canvas collaboration engine 620 can communicate with the content engine 630 to access the object data associated with the URL when the content engine 630 has a connection to the Internet, and the canvas collaboration engine 620 can access the object data over the network 650 or other connection to the Internet. The canvas collaboration engine 620 can include the object identified by the URL in the shared virtual canvas.

When an object is identified using a URL, the devices 612, 614 can be responsible for accessing the object data. For example, based on the user 602 identifying an object using a URL that is accessible on the Internet, the devices 612, 614 associated with the users 602, 604 can communicate with the content engine 630 and/or access the Internet through a connection over the network 650 to obtain object data associated with the URL. In such an implementation, the canvas collaboration engine 620 can determine a location of the object within the shared virtual canvas and can transmit information identifying the location of the image object to the devices 612, 614. The devices 612, 614 can access the object data and can display the object based on the field of view of the shared virtual canvas for each device 612, 614, the location of the object within the shared virtual canvas, and the object data.

To include an object in a shared virtual canvas, an initial location and size of the object on the virtual canvas can be determined. In some implementations, the location of the object in the virtual canvas can be initialized to be centered or otherwise overlap with the origin of the coordinate system of the shared virtual canvas. In addition, the initial image location can be set such that the image object is included in or overlaps with a field of view of one or more devices 612, 614. For example, the location of the object can overlap with the field of view of the device 612, 614 that uploaded the object to the shared virtual canvas.

In some implementations, the size of the object can be determined by the size of the image in pixels, e.g., based on the maximum width and height of the object in pixels. In other instances, the size of the object can be scaled to match the resolution of one or more of the devices 612, 614, such as the resolution of the device that uploaded the object to the virtual canvas. For example, a user 604 associated with a device 614 having a resolution of 320×480 pixels can upload an object with an initial size of 1000×1000 pixels, and the object can be included in the shared virtual canvas with a scaled size of 320×320 pixels to match the resolution of the device 614, enabling the full object to be viewed at the device 614.

As described herein, an object can include any digital content, or any non-digital content that is represented in a digital form. For example, an object can be any image, video, graphic object, portable document file (PDF), document, spreadsheet (e.g., Microsoft Excel spreadsheet), application, or other content that can be stored, for example, using the devices 612, 614 or the content engine 630. In some implementations, data associated with an object can include data defining the object as well as associated meta data or other information that describes the object. For example, object data can include data identifying a data type or format associated with the object, a date of creation of the object, a date of most recent access or editing of the object, data identifying an owner of the object, a URL or other method of accessing the object, information identifying the size and/or dimensions of the object, the location of the object in the shared virtual canvas, the user 602, 604 that included the object in the shared virtual canvas, the last user 602, 604 to move or edit the object in the shared virtual canvas, or any other information. In some examples, performing an operation relating to an object can include any of moving the object within the shared virtual canvas, resizing or editing the object or the content of the object, copying, cutting, or pasting the object, downloading the object, sending the object to another user 602, 604 or destination, e.g., in an email, accessing, opening, or expanding the object, or any other operation.

Users 602, 604 associated with devices 612, 614 can interact with a shared virtual canvas by moving objects in the virtual canvas, and the display of the shared virtual canvas at the devices 612, 614 can be updated based on the locations of the moved objects and the fields of view of the devices 612, 614. For example, a virtual canvas accessed by two devices 612, 614 can include an object, and the devices 612, 614 can have fields of view of the shared virtual canvas that include none, a portion, or all of the object. A user 602 associated with a device 612 that has a field of view that includes at least a portion of the object can move the object within the virtual canvas, for example, by performing a "touch and drag" gesture on the object. The displays of the devices 612, 614 can be updated to show the respective fields of view of the devices 612, 614 based on the movement of the object within the shared virtual canvas.

Updating a display at a device 612, 614 can involve accessing information identifying the field of view of the virtual canvas for the device 612, 614, information identifying the location of the object within the shared virtual canvas, and the object data. In some implementations, information identifying the field of view of the virtual canvas for a device 612 can be stored at the device 612, and, based on a user 602, 604 moving the object within the virtual canvas, information identifying the location of the object within the shared virtual canvas and the object data can be provided to the device 612. The device 612 can use the information identifying the field of view of the virtual canvas, the information identifying the location of the object within the shared virtual canvas, and the object data to provide a display of the field of view of the virtual canvas of the device 612. In this case, the device 612 displays the object based on the location of the object being within the field of view of the device 612 and does not display the object based on the location of the object being outside of the field of view of the device 612.

In another implementation, information identifying the field of view of the virtual canvas for a device 612 and object data can be stored at the device 612, and, based on a user 602, 604 moving the object within the virtual canvas, information identifying only the new location of the object within the shared canvas can be provided to the device 612. The device 612 can use the received object location information, along with the stored information identifying the field of view of the device 612 and the object data, to provide a display of the field of view of the virtual canvas of the device 612.

In some implementations, only object data is stored at the device 612, and based on a user 602, 604 moving the object within the virtual canvas, information identifying the field of view of the device 612 and/or information identifying a location of the object within the shared canvas can be provided to the device 612. The device 612 can use the received field of view and object location information, along with the stored object data, to provide a display of the field of view of the virtual canvas of the device 612.

In some examples, all of the information identifying the field of view of the device 612, the location of the object within the virtual canvas, and the object data can be received by the device 612 over the network 650. For example, the canvas collaboration engine 620 can transmit all of the information identifying the field of view of the device 612, the location of the object within the virtual canvas, and the object data to the device 612. The device 612 can receive the information, and can provide a display of the field of view of the virtual canvas of the device 612 based on the received information.

In some implementations, data defining a field of view of a device 612, 614 can be transmitted to the device 612, 614 based on the field of view being updated, e.g., based on receiving inputs at the devices 612, 614 indicating an adjustment to one or more fields of view of the devices 612, 614. In these implementations, data defining a field of view of a device 612, 614 may be transmitted based on that device's 612, 614 field of view being updated. Data defining fields of view of all devices 612, 614 may be transmitted whenever one or more fields of view are redefined. Also, data defining fields of view of one or more devices 612, 614 can be transmitted periodically and can indicate all or a subset of the fields of view of the devices 612, 614.

In some implementations, data identifying the location of an object within the virtual canvas and the object data can be transmitted whenever the object is moved or the object is modified, or can be transmitted periodically. In some implementations, the data transmitted pertains to objects that have been moved and/or modified that are within the virtual canvas, or can pertain to all objects within the virtual canvas. For example, if two objects are within the virtual canvas, and only one of the objects is moved and/or modified, the data transmitted can include the location and image data of the moved and/or modified object, or the transmitted data can include the location and image data of both the moved and/or modified object and the unmoved and/or unmodified object. Data identifying the fields of view, the locations of objects, and/or the object data can be stored locally at the devices 612, 614 once received. In some implementations, the data identifying the fields of view, the locations of objects, and/or the object data can be transmitted by the canvas collaboration engine 620.

In some examples, a shared virtual canvas and/or objects within a shared virtual canvas can be associated with one or more security measures, or can have access limited to only certain users 602, 604 or certain devices 612, 614. For example, security measures can limit the users that are able to access a mobile device collaboration session or a shared virtual canvas, can limit how users can interact with certain shared virtual canvases or objects within shared virtual canvases, and/or can limit which users can view and/or modify objects that are within a shared virtual canvas.

For example, a shared virtual canvas may only be accessible using a temporary URL that can be distributed to one or more users 602, 604 to enable them to access the shared virtual canvas. In such an instance, after a period of time, the URL associated with the shared virtual canvas can change or the shared virtual canvas can be removed, hidden, archived, or otherwise made unavailable. In some implementations, a shared virtual canvas can have a limit as to the number of users that can access the virtual canvas at any one time.

In addition, a shared virtual canvas can be associated with a password, and the users 602, 604 must enter the password to access the shared virtual canvas. In some implementations, users 602, 604 of the shared virtual canvas can each or collectively have an account or profile associated with the shared virtual canvas, and users 602, 604 can only access the shared virtual canvas based on providing account or profile login information. In these implementations, account or profile login information can include an account or user name as well as an account or user password. Further, the one or more devices 612, 614 can be permitted to access a shared virtual canvas based on having a certain device name, user name, Internet protocol (IP) address, or other characteristic.

Some security or privacy measures can require that a device 612, 614 be located in a certain geographical location in order for a shared virtual canvas to be accessible to the device 612, 614 and/or for certain objects to be displayed at a user interface of the device 612, 614. For example, a geographical location of the device 612, 614 can be determined using Global Positioning System (GPS) capabilities of the device 612, 614, and based on the device 612, 614 being located in an approved location, the shared virtual canvas can be provided for output to the device 612, 614. Approved geographical locations can be defined by a predetermined distance from a particular location, e.g., within one hundred yards of an office building, can be defined by a particular region, e.g., in New York City, can be defined by distances between multiple devices 612, 614 that are accessing a shared virtual canvas, e.g., when the devices 612, 614 are within one hundred yards of each other, or can be defined in another way.

In some implementations, privacy and/or security can be maintained by limiting the extent that certain users 602, 604 or devices 612, 614 can view and/or manipulate objects within a shared virtual canvas, and/or by limiting how users 602, 604 can adjust fields of view of devices 612, 614 accessing the virtual canvas. For example, a user 602 associated with a device 612 may be permitted to adjust the fields of view of devices 612, 614, and may be capable of moving objects within the shared virtual canvas, while a user 604 associated with a device 614 may not be able to adjust fields of view of devices 612, 614 or move objects. In some instances, despite not being able to manipulate objects or adjust fields of view, the user 604 may still be able to view objects within their field of view of the virtual canvas. In some examples, a user 602 can make an object private such that another user 604 cannot view the object, regardless of whether the object is within the field of view of the device 614 associated with the user 604. In some implementations, the user 602 can determine that an object should be visible or capable of being manipulated by some users, but hidden and/or incapable of being manipulated by other users.

In some implementations, the fields of view of more than one device 612, 614 can be adjusted through a single set of operations. For example, a series of "tap and hold" operations performed at three devices can result in the fields of view of two of the devices being adjusted concurrently. Referring to the operations performed with respect to FIGS. 1-4, a first user associated with a first device can perform a "tap and hold" gesture, and second and third users associated with second and third devices can also perform "tap and hold" gestures at their devices. The points of the three gestures on the displays of the three devices can be determined and the corresponding locations on the shared virtual canvas of the three points can be identified. The fields of view of the second and third devices can then be adjusted such that the points on the displays of the second and third devices correspond to the location of the first point on the shared virtual canvas. That is, the point on the display of the second device is aligned to the location on the virtual canvas that corresponds to the point on the display of the first device. Similarly, the point on the display of the third device is aligned to the location on the virtual canvas that corresponds to the point on the display of the first device.

According to some implementations, a user of a computing device that is accessing a shared virtual canvas through a collaboration session with one or more other computing devices can provide input to adjust the scale of the shared virtual canvas. For example, the user can provide input to increase the scale and/or decrease the scale of the shared virtual canvas, where the adjusted scaled of the shared virtual canvas can be reflected on all or a subset of the computing devices that are accessing the shared virtual canvas. In some implementations, the user can adjust the scale of the shared virtual canvas based on providing an appropriate input at the user's computing device, e.g., a "pinch" operation input at a location of the shared virtual canvas that is not occupied by an image object may result in a decrease in the scale of the shared virtual canvas. In response to receiving such an input, the canvas collaboration engine 620 or another component of the system 600 may cause the scale of the shared virtual canvas to adjust according to the received input such that the adjustment to the scale of the shared virtual canvas is reflected in the display of the shared virtual canvas at all or a subset of the computing devices that are accessing the shared virtual canvas and that are participating in the collaboration session.

In some implementations, the fields of view of the devices 612, 614 and/or the locations of objects within the shared virtual canvas can be reset. For example, performing a reset operation can involve one or more of the users 602, 604 inputting a reset command or gesture at the devices 612, 614. In this example, a reset operation can be performed based on receiving a reset input from one of the users 602, 604 of the shared virtual canvas. In another example, a reset operation is only performed if all of the users 602, 604 provide the reset input. Also, the reset operation can be performed based on a majority of the users 602, 604 providing the reset input. In some examples, a reset input can be an input "triple tap" gesture performed by a user 602, 604 at a touchscreen device, can be performed by selecting an "X," "back arrow," or other "reset" icon, or can be another input.

In some implementations, performing a reset operation can result in the fields of view of the devices 612, 614 being reset to their initial fields of view. For example, in response to a reset command being provided, the fields of view of the devices 612, 614 can all be adjusted to return to the origin of the virtual canvas coordinate system. Similarly, performing a reset operation can cause objects in the shared virtual canvas to move to their initial locations in the virtual canvas, or to move to a default location, e.g., to be centered at the origin of the virtual canvas coordinate system. In addition, performing a reset operation can cause objects in the virtual canvas that have been modified, e.g., by a change in size, color, etc., to be reset to their initial conditions, e.g., the objects' size, color, etc. at the time they were included in the virtual canvas.

In some implementations, a user 602, 604 associated with a device 612, 614 can remove the device 612, 614 from a shared virtual canvas or can leave a shared virtual canvas. For example, the user 602, 604 can navigate a web browser away from the URL associated with the shared virtual canvas, can turn the user's device off, can exit out of a web browser that is accessing the shared virtual canvas, or can otherwise leave or end the user's interaction with the shared virtual canvas.

In some implementations, removing a device 612, 614 from a shared virtual canvas does not affect the experience of other devices 612, 614 accessing the shared virtual canvas. For example, a device 612, 614 can leave a shared virtual canvas, and the fields of view of the remaining device(s) and locations of objects within the shared virtual canvas remain unchanged. In other implementations, removing a device 612, 614 from the shared virtual canvas can alter the fields of view of other devices 612, 614 and/or can modify the locations of objects within a shared virtual canvas. For example, three fields of view can be adjacent to one another such that they create a continuous field of view of the shared virtual canvas, i.e., such that they are all next to one another and not overlapping. Based on a device associated with the center field of view of the adjacent fields of view being removed, one or more of the other fields of view can be adjusted to compensate for the removed field of view. For example, the fields of view can be adjusted such that the remaining fields of view remain adjacent to one another. In another example, an object may only be within one of two fields of view of a virtual canvas, and based on the device 612, 614 associated with the field of view that includes the object being removed, the location of the object and/or the remaining field of view can be updated such that the object is within the remaining field of view.

In some implementations, notifications can be provided for output to users 602, 604 that provide information relevant to a mobile device collaboration session and/or a shared virtual canvas. In some instances, notifications can be textual notifications or notifications that include one or more images. In some instances, the notifications can be provided to all users 602, 604 accessing a shared virtual canvas, or can be provided to a subset of the users 602, 604.

Various notifications can be provided for output to the user 602, 604. For example, notifications can indicate when users 602, 604 have accessed, e.g., joined, a collaboration session with a shared virtual canvas. Similarly, notifications can indicate when one or more users 602, 604 have provided inputs related to adjusting a field of view of one or more devices 612, 614 accessing a shared virtual canvas. For example, a notification can be provided to the device 614 indicating that the user 602 has performed a "tap and hold" gesture at the device 612 related to adjusting the field of view of the device 614.

Maps or other notifications containing images also may be provided for output to users 602, 604 of a mobile device collaboration session. For example, a notification that includes a map can indicate the geographical locations of users 602, 604 accessing a shared virtual canvas. Other visual notifications can indicate a user's 602, 604 current field of view of a shared virtual canvas, can indicate other users' 602, 604 current fields of view of the shared virtual canvas, and/or can indicate the locations of objects within the shared virtual canvas.

In some implementations, devices 612, 614 can determine the relative physical locations of other devices 612, 614 that are accessing a shared virtual canvas, and can display a field of view of the virtual canvas differently based on the relative physical positions of the devices 612, 614. For example, a first device 612 can have a field of view that is larger than the field of view of a second device 614, and the field of view of the first device 612 can include the field of view of the second device 614, e.g., the smaller field of view can overlap with the larger field of view. Based on determining that the second device 614 is laying on top of the first device 612 such that the positions of the devices 612, 614 coincide with their relative fields of view, e.g., such that they are physically overlapped in the same way that their fields of view overlap, the first device 612 may not display the part of the field of view that is within the field of view of the second device 614. That is, the first device 612 may not display the portion of its field of view that is displayed by the second device 614 when the second device 614 is positioned on top of the first device 612 (and, therefore, is blocking a portion of the display of the first device 612).

Similarly, fields of view of devices 612, 614 can be automatically determined based on the relative physical positions of the devices 612, 614. For example, two devices 612, 614 that are positioned next to one another, e.g., when resting on a table or hung on a wall, may be assigned fields of view of a shared virtual canvas that are adjacent to one another. In some implementations, the relative locations of one or more devices 612, 614 can be determined by sensors associated with the devices, e.g., one or more proximity sensors, global positioning system (GPS) devices, near-field communications (NFC) devices associated with the devices 612, 614, radio-frequency identifications (RFID) devices associated with the devices 612, 614, etc.

In some implementations, devices 612, 614 can be associated with displays that are capable of presenting information in multiple orientations, e.g., in a vertical, or "portrait," orientation and a horizontal, or "landscape" orientation. The devices 612, 614 having displays capable of multiple orientations can be detected by the system 600, and a field of view of such a device 612, 614 can reflect and/or be updated based on the device display orientation and the display resolution. For example, a smart phone can have a display with a resolution of 320×480 pixels that can display information in either a "portrait" or "landscape" orientation. The device's orientation can be detected, and information indicating the device's orientation and the display's resolution can be transmitted, e.g., to the canvas collaboration engine 620. A field of view of the device can be determined based on both the orientation of the device's display, as well as the display resolution. For example, based on a device orientation indicating that a device is in a "portrait" orientation, the field of view of the device can be defined as a 320×480 pixel area of a shared virtual canvas, and based on a device orientation indicating that the device is in a "landscape" orientation, the field of view of the device can be defined as a 480×320 pixel area of the shared virtual canvas.

In some instances, a user 602, 604 can change the orientation of a device's display, and the field of view of the virtual canvas of the display can be updated based on the device's new orientation. For example, a smart phone can detect that a user has turned the smart phone from a horizontal position to a vertical position, and in response can update the orientation of the display of the smart phone from a "landscape" to a "portrait" orientation. Based on the orientation of the display being updated, the field of view of the device can also be adjusted.

In some implementations, the field of view of the device can be updated to remain centered on the same location of the shared virtual canvas. For example, a smart phone with a 320×480 pixel resolution can display a field of view in a "landscape" orientation that is centered at the coordinates (240, 160) of the virtual canvas and defined by the coordinates (0, 0), (0, 320), (480, 0) and (480, 320), and based on the orientation of the smart phone being switched to a "portrait" orientation, the new field of view can remain centered at the coordinates (240, 160) of the virtual canvas and be defined by the coordinates (80, −80), (80, 400), (400, −80), and (400, 400). In another implementation, based on the orientation of a display being updated, the field of view of the device can be reset, e.g., by returning the field of view to the origin of the virtual canvas, and the field of view can also reflect the new display orientation.

In some implementations, one or more components of the system 600 are combined or integrated into other components of the system 600. For example, in some instances, the canvas collaboration engine 620 and content engine 630 are combined as a single computing system capable of performing the operations described with respect to FIG. 6. The canvas collaboration engine 620 and/or content engine 630 can also be embedded into one or more of the devices 612, 614. For instance, a device 612 that includes a canvas collaboration engine 620 and content engine 630 can host a shared virtual canvas that is accessible by one or more other devices 614. The one or more devices 614 access the shared virtual canvas hosted by the device 612 over the network 650.

Figure 7:
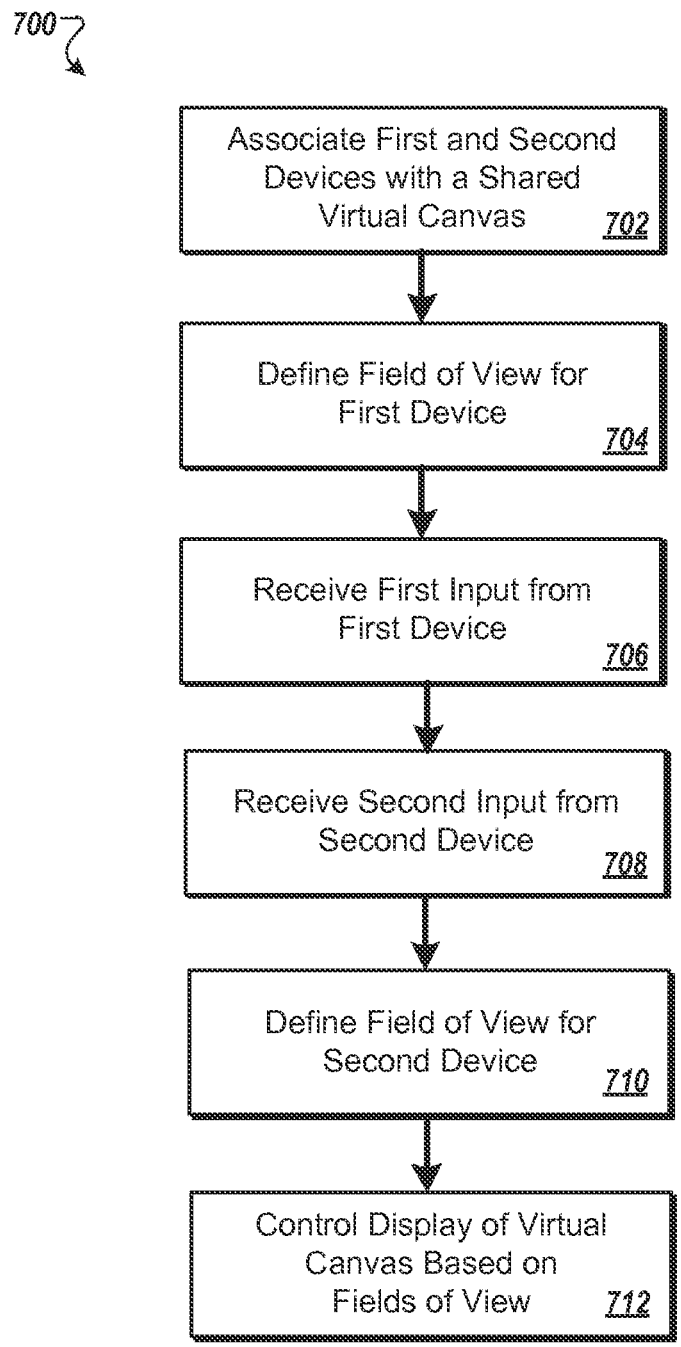
FIG. 7 is a flowchart of an example process of handling a collaboration session between multiple devices.

FIG. 7 illustrates an example process 700 for handling a collaboration session between multiple devices. Specifically, the process 700 can adjust fields of view of a shared virtual canvas associated with devices that access the shared virtual canvas, and can provide content for output at the devices based on the devices' fields of view.

In some implementations, the process 700 can be performed by one or more components of the system 600 of FIG. 6. Below, the process 700 has been described as being performed by the canvas collaboration engine 620, although other arrangements may be used.

The canvas collaboration engine 620 associates a first device and a second device with a shared virtual canvas (702). For example, the first and second devices access the shared virtual canvas by engaging in a collaboration session that is hosted by the canvas collaboration engine 620. In this example, the canvas collaboration engine 620 hosts a shared virtual canvas that is accessible by one or more devices, and a first device 612 and second device 614 access the shared virtual canvas by navigating to a URL associated with the shared virtual canvas. The canvas collaboration engine 620 may store data indicating that the first device and the second device are sharing the virtual canvas to associate the shared virtual canvas with the first and the second devices.

The canvas collaboration engine 620 defines, for the first device, a first field of view of the shared virtual canvas (704). For example, based on the device 612 accessing the shared virtual canvas hosted by the canvas collaboration engine 620, the canvas collaboration engine 620 assigns the device 612 a field of view of the shared virtual canvas based on the resolution of a display of the device 612. The field of view of the device 612 can be defined such that it includes the origin of the shared virtual canvas when the virtual canvas is associated with a coordinate system.

The canvas collaboration engine 620 receives first input (706). For example, the device 612 transmits data corresponding to first input that is received by the canvas collaboration engine 620. The first input can identify information that includes a resolution of a display of the first device, and coordinates of the display of the first device. For example, the canvas collaboration engine 620 can receive the first input from the device 612 associated with the user 602 over the network 650. As explained and shown in reference to FIG. 2, the first input can be received in response to a first user performing a "tap and hold" gesture that identifies a point 220 on a touchscreen of the first device, or based on another user input command associated with adjusting a field of view of one or more devices that are accessing a shared virtual canvas. In some examples, the resolution of the display of the first device can be identified in terms of pixels, e.g., 1024×768, and the coordinates of the display of the first device can be coordinates that correspond to a point on the pixel array of the display of the first device identified by the first user, e.g., coordinates associated with the point of the user-input "tap and hold" gesture. The coordinates received correspond to a first coordinate location on the shared virtual canvas that is determined based on the first device's field of view of the virtual canvas.

The canvas collaboration engine 620 receives second input (708). For example, the device 614 transmits data corresponding to second input that is received by the canvas collaboration engine 620. The second input can identify information that includes a resolution of a display of the second device, and coordinates of the display of the second device. For example, the canvas collaboration engine 620 can receive the second input from the device 614 associated with the user 604 over the network 650. Similar to the first input, the second input can be received in response to a second user performing a "tap and hold" or other gesture associated with a command to adjust a field of view of one or more devices that are accessing a shared virtual canvas. As shown in FIG. 3, for example, the second user can perform a "tap and hold" gesture that identifies a point 370 on a display of the second device, where the coordinates received can identify the point 370 on the display of the second device. The point on the display of the second device corresponds to a second coordinate location on the shared virtual canvas that is determined based on the second device's field of view of the virtual canvas.

In some implementations, the second input is received concurrently with the first input. For example, while a first "tap and hold" input is being "held" by the user 602 associated with the device 612, the user 604 associated with the device 614 can provide the second "tap and hold" input. In some instances, the second "tap and hold" input is received concurrently with the first "tap and hold" input such that the "hold" portions of each of the inputs are each "held" simultaneously for at least a threshold period of time. For example, the user 602 associated with the device 612 can provide a first "tap and hold" gesture at the device 612 and can continue to "hold" the input until the user 604 associated with the device 614 has provided a second "tap and hold" gesture at the device 614 and has "held" the input for at least one second while the first input is still being "held."

The canvas collaboration engine 620 defines, for the second device, a second field of view of the shared virtual canvas that is different than the first field of view (710). For example, based on the inputs received from the devices 612, 614, the canvas collaboration engine 620 shifts a field of view of the second device 614 such that the point on the display of the second device corresponds to the first coordinates of the virtual canvas identified by the first input. As shown with respect to FIG. 4, for example, based on an input received at a first device defining the point 220 on the user interface 100 and an input received at a second device defining the point 370 on the user interface 150, the field of view of the virtual canvas associated with the user interface 150 has been updated such that the point 370 corresponds to the coordinates of the virtual canvas identified by the point 220. An area of the second device's field of view of the shared virtual canvas is determined based on the resolution of the display of the second device. For example, the shared virtual canvas can be associated with a coordinate system that uses pixels as units of measurement, and an area of the field of view of the virtual canvas can be defined by coordinates of the shared virtual canvas.

The canvas collaboration engine 620 controls display of the virtual canvas based on the first field of view and the second field of view (712). For example, the canvas collaboration engine 620 determines content within the fields of view of the first and second devices and provides the content for output at displays of the devices. In this example, the canvas collaboration engine 620 accesses data that indicates the locations of one or more image objects within the shared virtual canvas as well as other image object data, e.g., data indicating the sizes, colors, shapes, and other relevant characteristics of the image objects. Based on the accessed image object data and the field of view of the first device, content within the field of view of the first device can be identified. In some instances, information identifying the field of view of the first device can be stored by the canvas collaboration engine 620. In addition, the field of view of the first device can be determined based on the resolution of the display of the first device and the first coordinates of the display of the first device that correspond to the first coordinates of the virtual canvas. Similarly, content within the field of view of the second device can be identified based on the accessed image data and the field of view of the second device. The canvas collaboration engine 620 can provide the content identified for the first device 612 and the content identified for the second device 614 to the respective devices 612, 614 by transmitting the content over the network 650. In some instances, the canvas collaboration engine 620 can provide the entire content of the shared virtual canvas to the devices 612, 614 such that the devices 612, 614 can display the content that falls within their respective fields of view at displays of the devices 612, 614. In these instances, the canvas collaboration engine 620 sends information describing the first field of view to the first device 612 and information describing the second field of view to the second device 614. The first device 612 and the second device 614 store the field of view information and use the stored field of view information to determine which content from the entire content of the shared virtual canvas to display and which content to discard.

Figure 8:
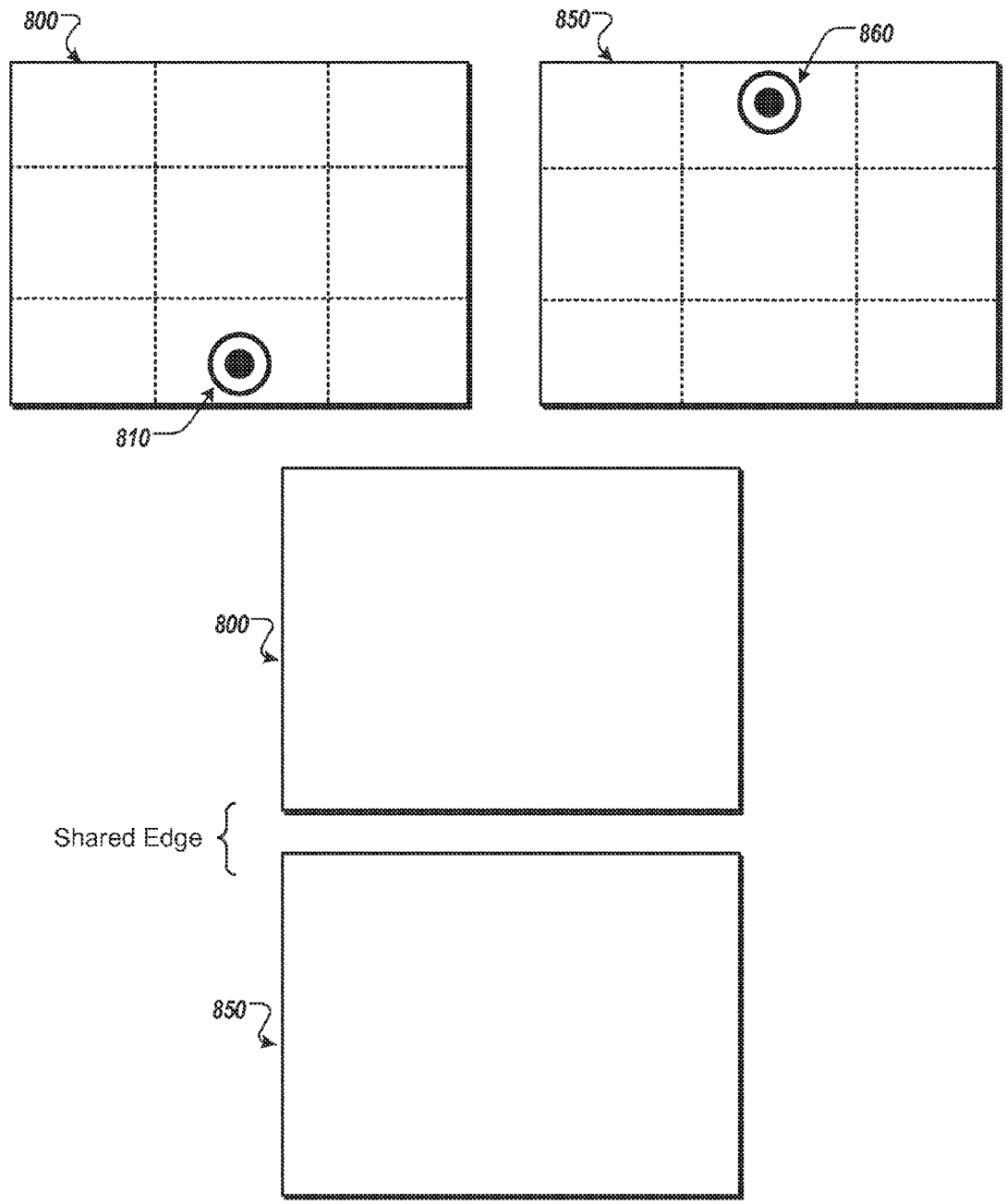
FIG. 8 illustrates example user interfaces of a mobile device collaboration session.

FIG. 8 illustrates example user interfaces 800, 850 associated with a mobile device collaboration session. Specifically, the user interfaces 800, 850 relate to an implementation in which inputs can be interpreted by the system to define adjacent fields of view of the user interfaces 800, 850. The adjacent fields of view can share at least one edge or point, e.g., corner, on a shared virtual canvas. The user interfaces 800, 850 can be displayed at the devices 612, 614 of the system 600 using the techniques described in the process 700.

As shown in FIG. 8, the user interfaces 800, 850 can be subdivided into regions. Input gestures received within those regions relate to defining fields of view of the user interfaces 800, 850. The input gestures can be identified as commands to adjust the fields of view of the user interfaces 800, 850 such that they share at least one common edge or corner. In some implementations, each region can correspond to a particular edge or corner of the field of view of the user interface 800, 850. For example, a bottom center region of the user interface 800 can correspond to the bottom edge of the field of view associated with the user interface 800, a bottom left region of the user interface 800 can correspond to the bottom left corner of the field of view associated with the user interface 800, etc.

Two inputs associated with defining fields of view can be received at the user interfaces 800, 850, and fields of view of the user interfaces 800, 850 can be adjusted such that they are adjacent. For example, a first "tap and hold" input 810 can be received in a bottom center region of the user interface 800, and a second "tap and hold" input 860 can be received in a top center region of the user interface 850. Based on the inputs 810, 860, the fields of view of the user interfaces 800, 850 can be adjusted such that the bottom edge of the field of view corresponding to the user interface 800 is adjacent to the top edge of the field of view corresponding to the user interface 850.

In some implementations, the input 810 is performed or initiated prior to the input 860. In response, the field of view of the user interface 800 can be maintained while the field of view of the user interface 850 is adjusted to be adjacent to the field of view of the user interface 800.

In some examples, one of the inputs 810, 860 can define an edge of a field of view, e.g., by being in a top center, right center, bottom center, or left center region, and a second input 810, 860 can define a corner of a field of view, e.g., by being in a top left, top right, bottom left, or bottom right region. Based on the first input 810, 860 defining an edge and the second input 810, 860 defining a corner, the inputs 810, 860 can be processed such that edges of the two fields of view of the user interfaces 800, 850 become adjacent. Similarly, based on the first input 810, 860 defining a corner and the second input 810, 860 defining an edge, the inputs 810, 860 can be processed such that the corners of the two fields of view of the user interfaces 800, 850 become adjacent, e.g., share only one common point on the shared virtual canvas Based on one input 810, 860 defining an edge and another input 810, 860 defining a corner, the fields of view of the user interfaces 800, 850 can be adjusted such that the identified corner becomes adjacent with the identified edge at only one point, e.g., by adjusting the fields of view such that only the identified corner of the field of view is adjacent to a corner of the identified edge of the field of view.

In some implementations, inputs 810, 860 received in a center region of a user interface 800, 850 are not interpreted as commands to make the fields of view of the user interfaces 800, 850 adjacent. Rather, if one or more inputs 810, 860 are not within a region defining an edge or corner of a user interface 800, 850, the inputs 810, 860 can be treated as commands to adjust the fields of view of the user interfaces 800, 850 according to the processes described with respect to FIGS. 1-4. Based on both of the inputs 810, 860 being within center regions of the user interfaces 800, 850, the inputs 810, 860 can be treated by the system such that the fields of view of the user interfaces 800, 860 are adjusted to be centered over one another.

In some implementations, an input 810, 860 can identify a particular edge or corner of a field of view based on the input 810, 860 being within a threshold distance of an edge or corner of the user interface 800, 850. For example, an input gesture can identify an edge or corner of a field of view if the input gesture identifies a point on a user interface 800, 850 that is within a certain number of pixels of an edge or corner of the user interface 800, 850. Similarly, an input gesture can identify an edge or corner of a field of view if the input gesture is within a threshold distance, e.g., 0.5 inches, of an edge or corner of the user interface 800, 850. In such an implementation, inputs 810, 860 that are outside of the threshold distance of an edge or corner of the user interface 800, 850, e.g., that are closer to the center of the user interface 800, 850, can be processed according to the techniques described with respect to FIGS. 1-4.

Figure 9:
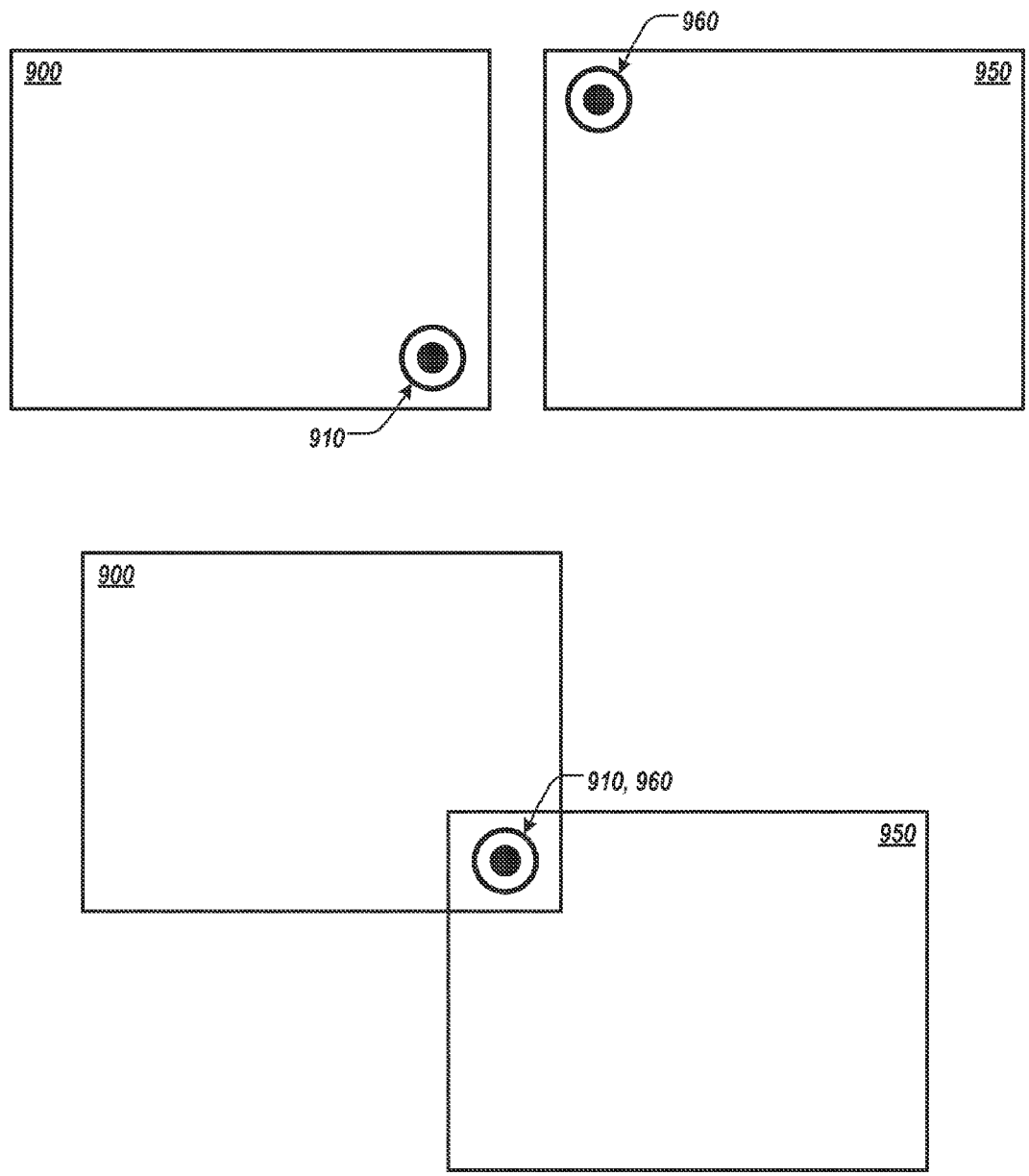
FIG. 9 illustrates example user interfaces of a mobile device collaboration session.

FIG. 9 illustrates example user interfaces 900, 950 associated with a mobile device collaboration session. Specifically, the user interfaces 900, 950 relate to an implementation in which inputs received at devices accessing a shared virtual canvas can be interpreted by the system to define fields of view of the user interfaces 900, 950 that overlap. The overlapping fields of view can share a portion of the shared virtual canvas that is defined by inputs received at the user interfaces 900, 950. The user interfaces 900, 950 can be displayed at the devices 612, 614 of the system 600 using the techniques described with respect to FIGS. 1-4.

As shown in FIG. 9, inputs 910, 960 are received at the user interfaces 900, 950. For example, users 602, 604 associated with devices 612, 614 displaying the user interfaces 900, 950 perform "tap and hold" gestures at the user interfaces 900, 950. The "tap and hold" gestures are interpreted as inputs 910, 960 defining points on the user interfaces 900, 950 that correspond to locations on the shared virtual canvas.

Based on the inputs 910, 960, the field of view of the user interface 950 is adjusted such that it overlaps with the field of view of the user interface 900. Specifically, the field of view of the user interface is adjusted in such a way that the position on the user interface 950 associated with the input 960 corresponds to the location on the shared virtual canvas identified by the input 910.

For example, the user interface 900 can be associated with a display having a 1024×768 resolution and a field of view defined by the coordinates (0,0), (0, 768), (1024, 0), and (1024, 768) of the virtual canvas. The user interface 950 can also be associated with a display having a resolution of 1024× 768 and a field of view defined by the coordinates (0,0), (0, −768), (1024, 0), and (1024, −768) of the virtual canvas. That is, the field of view of the user interface 950 is directly below the field of view of the user interface 900 on the shared virtual canvas.

The input 910 can define a point on the user interface 900 having the coordinates (924, 100) corresponding to a location on the shared virtual canvas defined by the coordinates (924, 100). The input 960 can define a point on the user interface 950 having the coordinates (100, 668) corresponding to a location on the shared virtual canvas defined by the coordinates (100, −100). After shifting the field of view of the user interface 950, the point on the user interface 950 having the coordinates (100, 668) can correspond to the location on the shared virtual canvas defined by the coordinates (924, 100). That is, the user interface 950 can have a new field of view of the shared virtual canvas that overlaps with the field of view of the user interface 900, the new field of view of the user interface 950 being defined by the coordinates (824, 200), (824, −568), (1848, 200), and (1848, −568) of the virtual canvas.

Figure 10A:
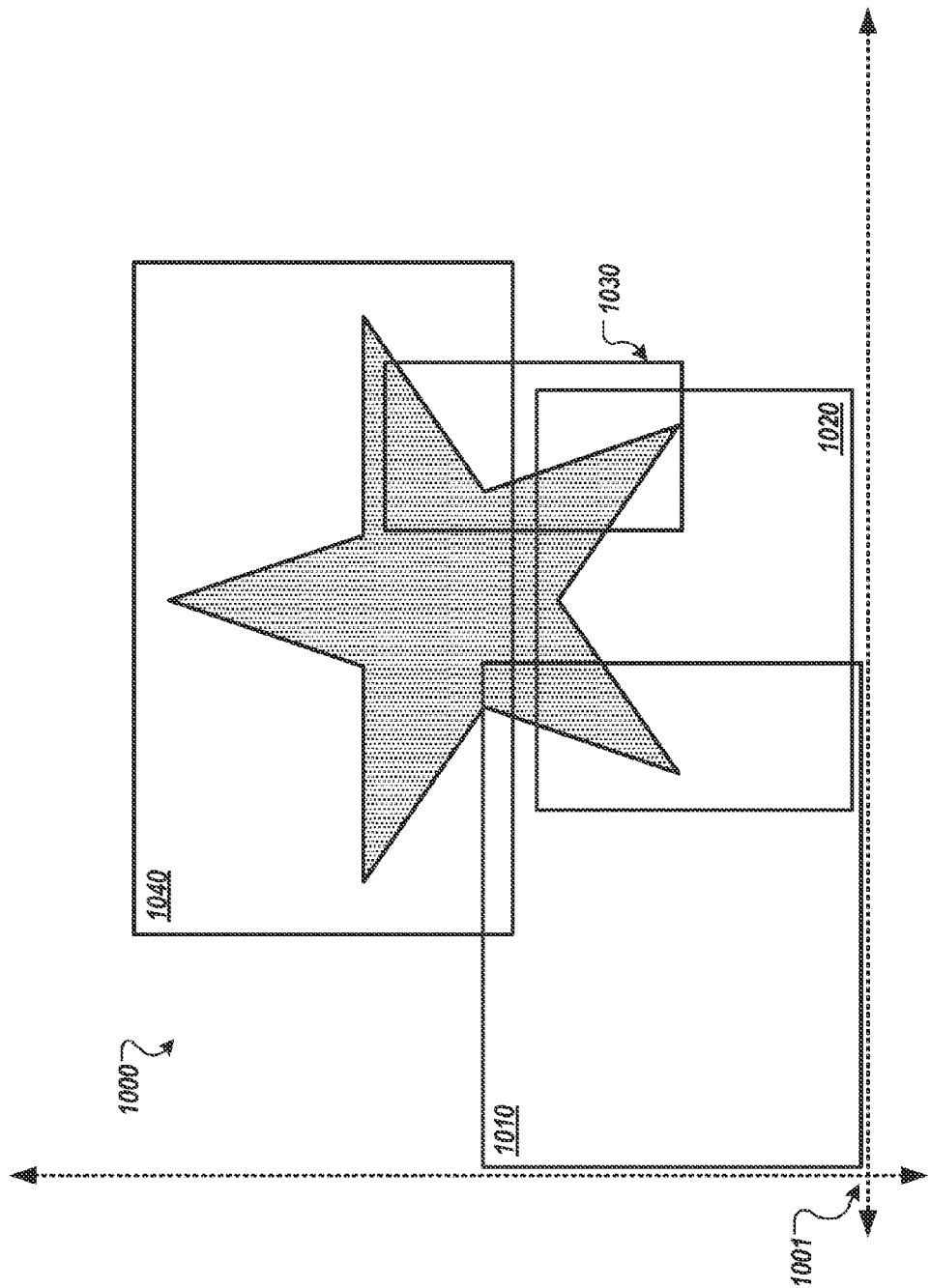
FIGS. 10A and 10B illustrate an example use of a collaboration session between multiple devices.

FIG. 10A illustrates an example interface of a mobile device collaboration session. Specifically, the example interface is a shared virtual canvas 1000 that contains an image object and that is being accessed by devices having fields of view 1010, 1020, 1030, 1040 of the shared virtual canvas 1000. The shared virtual canvas 1000 is associated with a coordinate system 1001. The image object and fields of view 1010, 1020, 1030, 1040 can be at particular locations on the shared virtual canvas 1000 that are defined by coordinates of the shared virtual canvas 1000.

For example, the image object of a star, as illustrated in FIG. 10A, can be centered at a particular location on the shared virtual canvas 1000, and can have a particular size and other characteristics that are defined by meta data or other image object data. For example, the image object of a star can be centered at the coordinates (1300, 800) of the shared virtual canvas 1000. The fields of view 1010, 1020, 1030, 1040 can be associated with four different devices having different display resolutions. For example, a first field of view 1010 can be associated with a device having a resolution of 1024×768, e.g., a laptop computer, a second field of view 1020 can be associated with a device having a resolution of 800×600, e.g., a tablet computer, a third field of view 1030 can be associated with a device having a resolution of 320× 480, e.g., a smart phone, and a fourth field of view 1040 can be associated with a device having a resolution of 1366×768, e.g., a desktop computer.

According to the example shown in FIG. 10A, the fields of view 1010, 1020, 1030, 1040 have been adjusted using the techniques described with respect to FIGS. 1-4 such that the user interfaces corresponding to the fields of view 1010, 1020, 1030, 1040 each have a different field of view of the shared virtual canvas 1000. Thus, different portions of the star shaped image object are within the fields of view 1010, 1020, 1030, 1040.

Figure 10B:
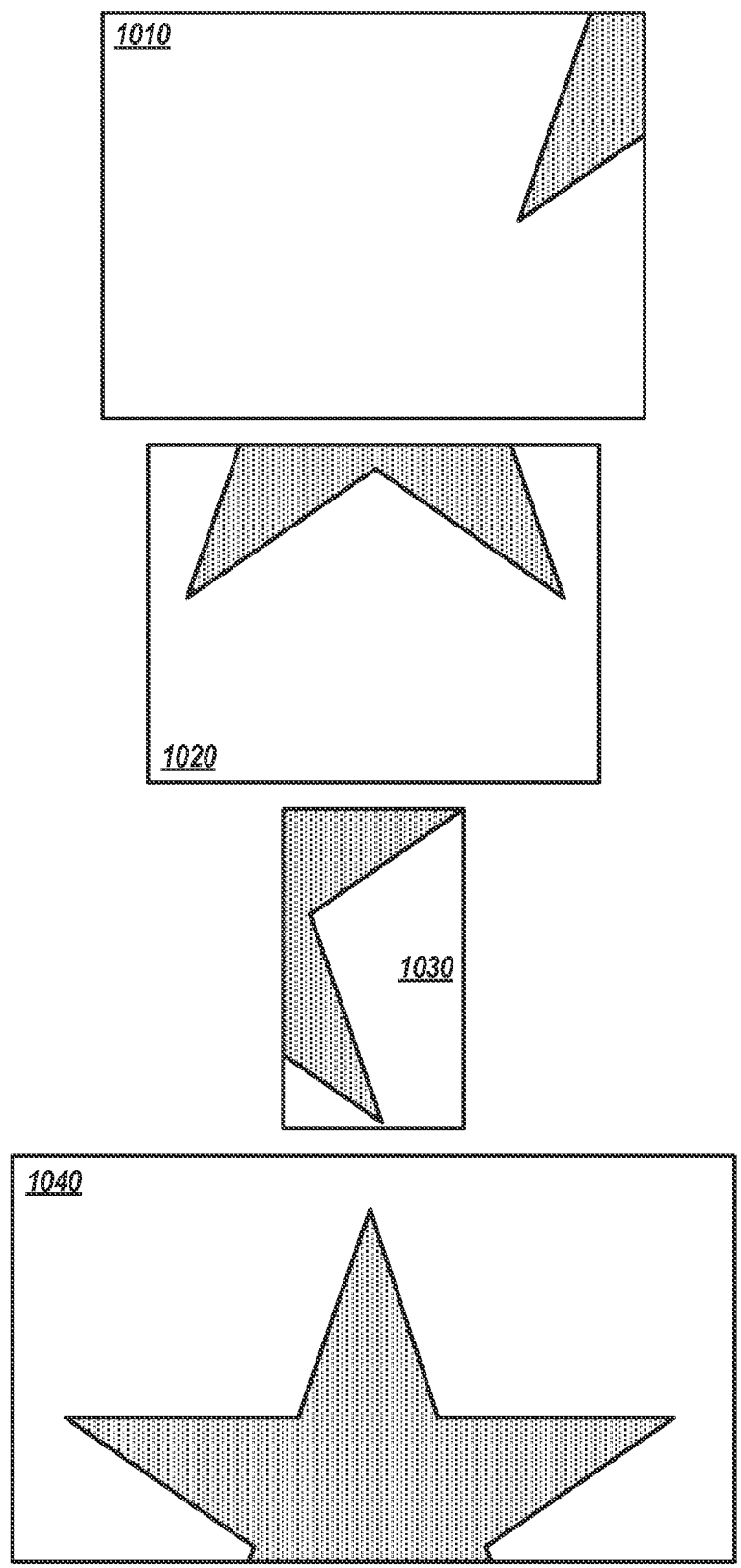

FIG. 10B illustrates the fields of view 1010, 1020, 1030, 1040 as they are output at user interfaces to which the fields of view 1010, 1020, 1030, 1040 correspond. For example, the user interfaces can be output at devices accessing the shared virtual canvas 1000. For example, the field of view 1010 associated with a laptop computer display can include a portion of the bottom left point of the star image object, the field of view 1020 associated with a tablet computer display can include a portion of the bottom half of the star image object, the field of view 1030 associated with a smart phone display can include a portion of the right side of the star shaped image object, and the field of view 1040 associated with a desktop computer display can include a top half of the star image object. Based on the fields of view 1010, 1020, 1030, 1040 and/or the star shaped image object being moved within the shared virtual canvas 1000, the content displayed in the user interfaces corresponding to the fields of view 1010, 1020, 1030, 1040 can be different or can be the same, according to the techniques described throughout this disclosure.

Implementations and all of the functional operations described in this specification may be implemented in digital electronic circuitry, or in computer software, firmware, or hardware, including the structures disclosed in this specification and their structural equivalents, or in combinations of one or more of them. Implementations may include one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files dedicated to the program in question (e.g., in files that store one or more modules, sub programs, or portions of code associated with the program in question). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, examples may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Examples may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, various forms of the processes described above may be used, with steps re-ordered, added, or removed. Accordingly, other implementations are within the scope of the following claims.

What is claimed is:

1. A computer implemented method of handling a collaboration session between multiple devices, the method comprising:
    associating a virtual canvas with a first device and a second device based on the first device and the second device engaging in a collaboration session, the first device having a first display and the second device having a second display;
    defining, for the first device, a first field of view of the virtual canvas;
    receiving, from the first device, first input specifying first coordinates of the first display of the first device, the first input being received during a first time period;
    receiving, from the second device, second input specifying second coordinates of the second display of the second device, the second input being received during a second time period that overlaps with the first time period;
    defining, for the second device, a second field of view of the virtual canvas that overlaps with the first field of view of the virtual canvas and that aligns with the first field of view of the virtual canvas based on the first coordinates specified in the first input and the second coordinates specified in the second input, the second field of view being different than the first field of view; and
    controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

2. The method of claim 1, further comprising:
    associating the virtual canvas with a third device based on the third device engaging in the collaboration session, the third device having a third display;
    receiving, from the third device, third input specifying third coordinates of the third display of the third device, the third input being received during a third time period that overlaps with the first time period;
    defining, for the third device, a third field of view of the virtual canvas that aligns with the first field of view of the virtual canvas based on the first coordinates specified in the first input and the third coordinates specified in the third input, the third field of view being different than the first field of view; and
    controlling display of the virtual canvas based on the third field of view defined for the third device such that the object on the virtual canvas is displayed on the third display of the third device based on the object being located with the third field of view, and the object on the virtual canvas is not displayed on the third display of the third device based on the object being located outside of the third field of view.

3. The method of claim 1, further comprising:
receiving third input specifying a reset command; and
in response to receiving the third input specifying the reset command:
adjusting, for the second device, the second field of view of the virtual canvas that aligns with the first field of view of the virtual canvas to be a default field of view of the virtual canvas that aligns with the first field of view of the virtual canvas.

4. The method of claim 1, wherein the object on the virtual canvas is uploaded to the virtual canvas by one of the first device or the second device while the first device and the second device are engaged in the collaboration session.

5. The method of claim 1, further comprising:
receiving third input identifying a linked resource associated with an object to include on the virtual canvas;
accessing the linked resource associated with the object to include on the virtual canvas;
based on accessing the linked resource associated with the object to include on the virtual canvas, obtaining object data associated with the object to include on the virtual canvas; and
adding the object to the virtual canvas using the accessed object data such that the object is included on the virtual canvas.

6. The method of claim 1, further comprising maintaining the first field of view defined for the first device responsive to the first input and the second input.

7. A computer implemented method of handling a collaboration session between multiple devices, the method comprising:
associating a virtual canvas with a first device and a second device based on the first device and the second device engaging in a collaboration session, the first device having a first display and the second device having a second display;
defining, for the first device, a first field of view of the virtual canvas;
receiving, from the first device, first input specifying first coordinates of the first display of the first device, the first input being received during a first time period;
receiving, from the second device, second input specifying (i) second coordinates of the second display of the second device, and (ii) a resolution of the second display of the second device, the second input being received during a second time period that overlaps with the first time period;
defining, for the second device, a second field of view of the virtual canvas that aligns with the first field of view of the virtual canvas based on the first coordinates specified in the first input and the second coordinates specified in the second input, the second field of view being different than the first field of view and being defined such that an area of the second field of view of the virtual canvas corresponds to the resolution of the second display of the second device; and
controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

8. A computer implemented method of handling a collaboration session between multiple devices, the method comprising:
associating a virtual canvas with a first device and a second device based on the first device and the second device engaging in a collaboration session, the first device having a first display and the second device having a second display;
defining, for the first device, a first field of view of the virtual canvas;
receiving, from the first device, first input specifying first coordinates of the first display of the first device, the first input being received during a first time period;
receiving, from the second device, second input specifying (i) second coordinates of the second display of the second device, (ii) a resolution of the second display of the second device, and (iii) a pixel size of the second display of the second device, the second input being received during a second time period that overlaps with the first time period;
defining, for the second device, a second field of view of the virtual canvas that aligns with the first field of view of the virtual canvas based on the first coordinates specified in the first input and the second coordinates specified in the second input, the second field of view being different than the first field of view and being defined such that an area of the second field of view of the virtual canvas corresponds to the resolution of the second display of the second device and the area of the second field of view of the virtual canvas is scaled based on the pixel size of the second display of the second device; and
controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

9. A computer implemented method of handling a collaboration session between multiple devices, the method comprising:
associating a virtual canvas with a first device and a second device based on the first device and the second device engaging in a collaboration session, the first device having a first display and the second device having a second display;
defining, for the first device, a first field of view of the virtual canvas;
receiving, from the first device, a first tap and hold input specifying first coordinates of the first display of the first device, the first input being received during a first time period;
receiving, from the second device, a second tap and hold input specifying second coordinates of the second display of the second device, the second input being received during a second time period that overlaps with the first time period;

defining, for the second device, a second field of view of the virtual canvas that aligns with the first field of view of the virtual canvas based on the first coordinates specified by the first tap and hold input and the second coordinates specified by the second tap and hold input, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

10. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device, the first input being received during a first time period;

receiving, from the second device, second input specifying second coordinates of the second display of the second device, the second input being received during a second time period that overlaps with the first time period;

defining, for the second device, a second field of view of the virtual canvas that does not overlap with the first field of view of the virtual canvas and that aligns with the first field of view of the virtual canvas based on the first coordinates specified in the first input and the second coordinates specified in the second input, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

11. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device that map to first coordinates of the virtual canvas, the first input being received during a first time period;

receiving, from the second device, second input specifying second coordinates of the second display of the second device that map to second coordinates of the virtual canvas, the second input being received during a second time period that overlaps with the first time period;

aligning the second coordinates of the second display of the second device with the first coordinates of the virtual canvas;

defining, for the second device, a second field of view of the virtual canvas that aligns with the first field of view of the virtual canvas based on the alignment of the second coordinates of the second display of the second device with the first coordinates of the virtual canvas such that the second coordinates of the second display of the second device display the same point of the virtual canvas as the first coordinates of the first display of the first device, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

12. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device that are associated with a first edge of the first display of the first device, the first input being received during a first time period;

receiving, from the second device, second input specifying second coordinates of the second display of the second device that are associated with a second edge of the second display of the second device, the second input being received during a second time period that overlaps with the first time period;

defining, for the second device, a second field of view of the virtual canvas that aligns the first edge of the first display of the first device with the second edge of the second display of the second device such that an edge of the first field of view corresponding to the first edge of the first display of the first device is adjacent to an edge of the second field of view corresponding to the second edge of the second display of the second device, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

13. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device that are associated with a first corner of the first display of the first device, the first input being received during a first time period;

receiving, from the second device, second input specifying second coordinates of the second display of the second device that are associated with a second corner of the second display of the second device, the second input being received during a second time period that overlaps with the first time period;

defining, for the second device, a second field of view of the virtual canvas that aligns the first corner of the first display of the first device with the second corner of the second display of the second device such that a corner of the first field of view corresponding to the first corner of the first display of the first device is adjacent to a corner of the second field of view corresponding to the second corner of the second display of the second device, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

14. A computer implemented method of handling a collaboration session between multiple devices, the method comprising:

associating a virtual canvas with a first device and a second device based on the first device and the second device engaging in a collaboration session that is associated with one or more conditions on engaging in the collaboration session, the first device having a first display and the second device having a second display, the associating comprising:

receiving a first request, from the first device, for the first device to engage in the collaboration session, receiving a second request, from the second device, for the second device to engage in the collaboration session, responsive to receiving the first request and the second request, accessing data identifying the one or more conditions on engaging in the collaboration session, evaluating whether the first request to engage in the collaboration session allows the first device to engage in the collaboration session, the evaluation including analyzing whether the first request satisfies the one or more conditions on engaging in the collaboration session, evaluating whether the second request to engage in the collaboration session allows the second device to engage in the collaboration session, the evaluation including analyzing whether the second request satisfies the one or more conditions on engaging in the collaboration session, based on the evaluation results, determining that the one or more conditions on engaging in the collaboration session allow the first device and the second device to engage in the collaboration session, the determination including determining, based on the analysis results, that the first request and the second request both satisfy the one or more conditions on engaging in the collaboration session, and associating the virtual canvas with the first device and the second device based on the first device and the second device being allowed to engage in the collaboration session;

defining, for the first device, a first field of view of the virtual canvas;

receiving, from the first device, first input specifying first coordinates of the first display of the first device, the first input being received during a first time period;

receiving, from the second device, second input specifying second coordinates of the second display of the second device, the second input being received during a second time period that overlaps with the first time period;

defining, for the second device, a second field of view of the virtual canvas that aligns with the first field of view of the virtual canvas based on the first coordinates specified in the first input and the second coordinates specified in the second input, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

15. A computer implemented method of handling a collaboration session between multiple devices, the method comprising:

associating a virtual canvas that is associated with a coordinate system that defines an origin of the virtual campus with a first device and a second device based on the first device and the second device engaging in a collaboration session, the first device having a first display and the second device having a second display, wherein associating the virtual canvas with the first device and the second device based on the first device and the second device engaging in the collaboration session comprises defining, for the first device and the second device, initial fields of view of the virtual canvas that include the original of the virtual canvas defined by the coordinate system;

defining, for the first device, a first field of view of the virtual canvas;

receiving, from the first device, first input specifying first coordinates of the first display of the first device, the first input being received during a first time period;

receiving, from the second device, second input specifying second coordinates of the second display of the second device, the second input being received during a second time period that overlaps with the first time period;

defining, for the second device, a second field of view of the virtual canvas that aligns with the first field of view of the virtual canvas based on the first coordinates specified in the first input and the second coordinates specified in the second input, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

16. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device, the first input being received during a first time period;

receiving, from the second device, second input specifying second coordinates of the second display of the second device, the second input being received during a second time period that overlaps with the first time period;

determining, by one or more sensors associated with the first device, a first physical location of the first device;

determining, by one or more sensors associated with the second device, a second physical location of the second device;

determining, based on the first physical location of the first device and the second physical location of the second device, a relative position of the first device with respect to the second device;

defining, for the second device, a second field of view of the virtual canvas that aligns with the first field of view of the virtual canvas based on the first coordinates specified in the first input, the second coordinates specified in the second input, and the relative position of the first device with respect to the second device, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

17. A computer implemented method of handling a collaboration session between multiple devices, the method comprising:

associating a virtual canvas with a first device and a second device based on the first device and the second device engaging in a collaboration session, the first device having a first display and the second device having a second display;

defining, for the first device, a first field of view of the virtual canvas;

receiving, from the first device, first input specifying first coordinates of the first display of the first device, the first input being received during a first time period;

receiving, from the second device, second input specifying second coordinates of the second display of the second device, the second input being received during a second time period that overlaps with the first time period;

maintaining the first field of view defined for the first device response to the first input and the second input, wherein maintaining the first field of view defined for the first device comprises:

determining that the first input received during the first time period was received prior to the second input received during the second time period that overlaps with the first time period, and determining to maintain the first field of view defined for the first device responsive to the first input and the second input based on the determination that the first input received during the first time period was received prior to the second input received during the second time period that overlaps with the first time period;

defining, for the second device, a second field of view of the virtual canvas that aligns with the first field of view of the virtual canvas based on the first coordinates specified in the first input and the second coordinates specified in the second input, the second field of view being different than the first field of view; and controlling display of the virtual canvas based on the first field of view defined for the first device and the second field of view defined for the second device such that an object on the virtual canvas is displayed on the first display of the first device based on the object being located with the first field of view, the object on the virtual canvas is not displayed on the first display of the first device based on the object being located outside of the first field of view, the object on the virtual canvas is displayed on the second display of the second device based on the object being located within of the second field of view, and the object on the virtual canvas is not displayed on the second display of the second device based on the object being located outside of the second field of view.

\* \* \* \* \*